US008652386B2

(12) United States Patent
Hong et al.

(10) Patent No.: US 8,652,386 B2
(45) Date of Patent: Feb. 18, 2014

(54) ALIGNMENT OF CARBON NANOTUBES COMPRISING MAGNETICALLY SENSITIVE METAL OXIDES IN NANOFLUIDS

(75) Inventors: Haiping Hong, Rapid City, SD (US); G. P. "Bud" Peterson, Atlanta, GA (US)

(73) Assignees: Georgia Tech Research Corporation, Atlanta, GA (US); South Dakota Board of Regents, Pierre, SD (US)

( * ) Notice: Subject to any disclaimer, the term of this patent is extended or adjusted under 35 U.S.C. 154(b) by 118 days.

(21) Appl. No.: 13/234,144

(22) Filed: Sep. 15, 2011

(65) Prior Publication Data

US 2012/0235080 A1     Sep. 20, 2012

Related U.S. Application Data

(60) Provisional application No. 61/383,670, filed on Sep. 16, 2010.

(51) Int. Cl.
*B29C 55/00* (2006.01)

(52) U.S. Cl.
USPC ................. 264/289.6; 264/108; 264/172.11; 252/70

(58) Field of Classification Search
None
See application file for complete search history.

(56) References Cited

U.S. PATENT DOCUMENTS

| | | | |
|---|---|---|---|
| 6,858,157 B2 * | 2/2005 | Davidson et al. | 252/70 |
| 8,246,886 B2 * | 8/2012 | Lashmore et al. | 264/289.6 |
| 2002/0100578 A1 | 8/2002 | Withers et al. | |
| 2005/0239948 A1 | 10/2005 | Haik et al. | |
| 2007/0158610 A1 * | 7/2007 | Hong et al. | 252/71 |
| 2008/0063587 A1 | 3/2008 | Strano et al. | |
| 2008/0302998 A1 | 12/2008 | Hong et al. | |

OTHER PUBLICATIONS

Ruoff, R. et al. "Mechanical and Thermal Properties of Carbon Nanotubes", *Molecular Physics Laboratory*, SRI International, Menlo Park, CA, Carbon 33(7):925-30 (1995).
Dai, H., "Carbon Nanotubes: Opportunities and Challenges", *Surface Science*, Dept. of Chemistry, Stanford University, Stanford, CA, 500:218-41 (2002).
Keblinkski, P. et al., "Nanofluids for Thermal Transport", *Materials Today*, 8(6):36-44 (2005).
Wang, X. et al. "Thermal Conductivity of Nanoparticle-Fluid Mixture", *Journal of Thermophysics and Heat Transfer*, 13(4)474-80 (1999).
Li, C. et al. "Experimental Investigation of Temperature and Volume Fraction Variations on the Effective Thermal Conductivity of Nanoparticle Suspensions (nanofluids)", *Journal of Applied Physics*, 99:084314-1 to 084314-8 (2006).
Wen, D. et al. "Experimental Investigation Into the Pool Boiling Heat Transfer of Aqueous Based γ-Alumina Nanofluids", *Journal of Nanoparticle Research*, 7:265-74 (2005).
Kim, B. et al. "Effect of Morphology of Carbon Nanotubes on Thermal Conductivity Enhancement of Nanofluids", *Journal of Thermophysics and Heat Transfer*, 21(3):451 (2007).
Hong, H. et al. "Heat Transfer Nanofluids Based on Carbon Nanotubes", *Journal of Thermophysics and Heat Transfer*, 21(1):234-9 (2007).

(Continued)

*Primary Examiner* — Necholus Ogden, Jr.
(74) *Attorney, Agent, or Firm* — McKee, Voorhees & Sease, P.L.C.

(57) ABSTRACT

The present invention is a nanoparticle mixture or suspension or nanofluid comprising nonmagnetically sensitive nanoparticles, magnetically sensitive nanoparticles, and surfactant(s). The present invention also relates to methods of preparing and using the same.

6 Claims, 8 Drawing Sheets

(56) References Cited

OTHER PUBLICATIONS

McCormack, M. et al. "Improved Mechanical Properties in New, Pb-Free Solder Alloys", *Journal of Electronic Materials*, 23(8):715-20 (1994).
Hong, H. et al. "Enhanced Thermal Conductivity by the Magnetic Field in Heat Transfer Nanofluids Containing Carbon Nanotube", *Synthetic Metals*, 157(10-12):437-40 (2007).
Biercuk, M. et al. "Carbon Nanotube Composites for Thermal Management", *Applied Physics Letters*, 80(15):2767-69 (2002).
Berber, S. et al. "Unusually High Thermal Conductivity of Carbon Nanotubes", *Physical Review Letters*, 84(20):4613-16 (2000).
Choi, S. et al. "Anomalous Thermal Conductivity Enhancement in Nanotube Suspensions", *Applied Physics Letters*, 79(14):2252-54 (2001).
Buongiorno, J. et al. "A Benchmark Study on the Thermal Conductivity of Nanofluids", *Journal of Applied Physics*, 106(1094312):1-14 (2009).
Xie, H. et al. "Nanofluids Containing Multiwalled Carbon Nanotubes and Their Enhanced Thermal Conductivities", *Journal of Applied Physics*, 94(8):4967-71 (2003).
Wamkam, C. et al. "Effects of $p$H on Heat Transfer Nanofluids Containing $ZrO_2$ and $TiO_2$ Nanoparticles", *Journal of Applied Physics*, 109(024305):1-5 (2011).
Philip, J. et al. "Nanofluid with Tunable Thermal Properties", *Applied Physics Letters*, 92(043108):1-3 (2008).
Zhu, H. et al. "Effects of Nanoparticle Clustering and Alignment on Thermal Conductivities of $Fe_3O_4$ Aqueous Nanofluids", *Applied Physics Letters*, 89(023123):1-3 (2006).
Wright, B. et al. "Magnetic Field Enhanced Thermal Conductivity in Heat Transfer Nanofluids Containing Ni Coated Single Wall Carbon Nanotubes", *Applied Physics Letters*, 91(173116):1-3 (2007).
Horton, M. et al. "Magnetic Alignment of Ni-Coated Single Wall Carbon Nanotubes in Heat Transfer Nanofluids", *Journal of Applied Physics*, 107(104320):1-4 (2010).
Wensel, J. et al. "Enhanced Thermal Conductivity by Aggregation in Heat Transfer Nanofluids Containing Metal Oxide Nanoparticles and Carbon Nanotubes", *Applied Physics Letters*, 92(023110);1-3 (2008).
Shima, P.D. et al. "Magnetically Controllable Nanofluid with Tunable Thermal Conductivity and Viscosity", *Applied Physics Letters*, 95(133112):1-3 (2009).
Bahrami, M., et al. "Modeling Thermal Contact Resistance: A Scale Analysis Approach", *Journal of Heat Transfer*, 126:896-905 (2004.
PCT Written Opinion, issued in PCT/US2011/052007, mailed Feb. 16, 2012.

\* cited by examiner

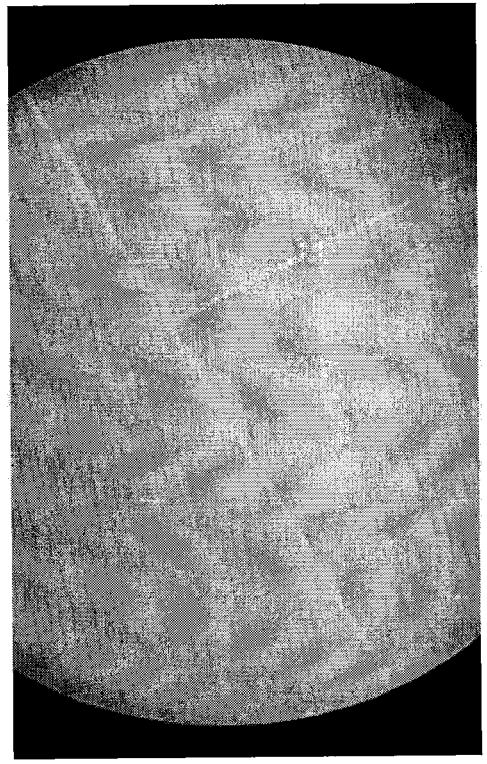
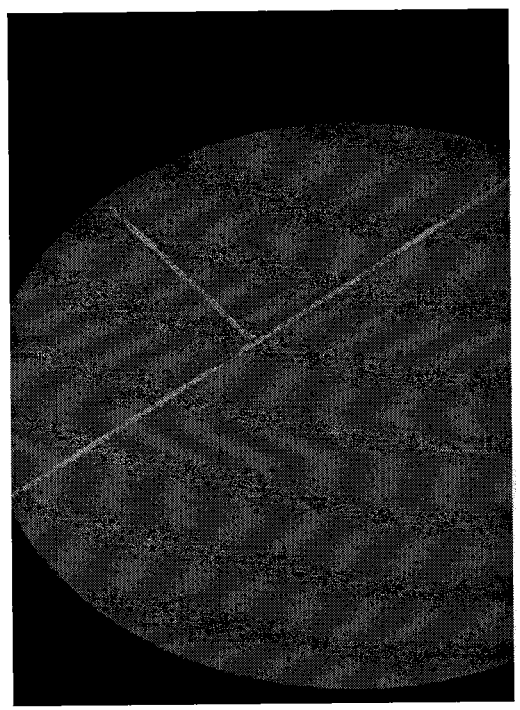
Fig. 2

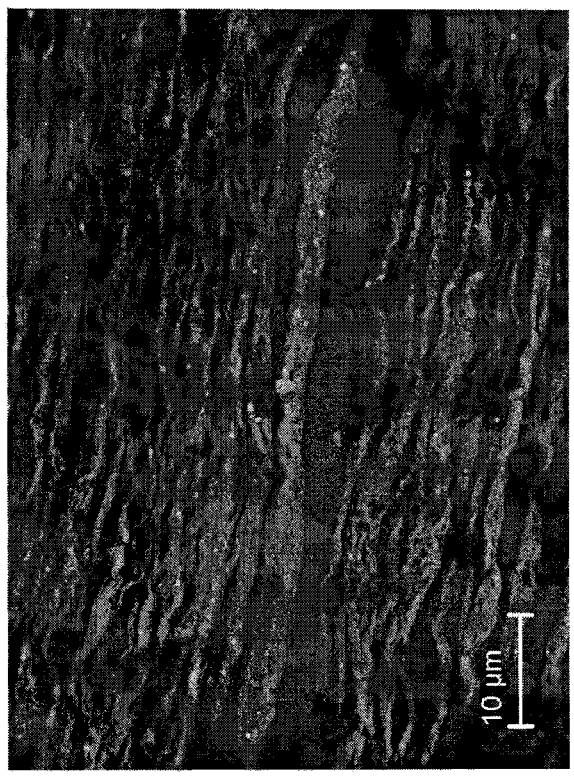
Fig. 6

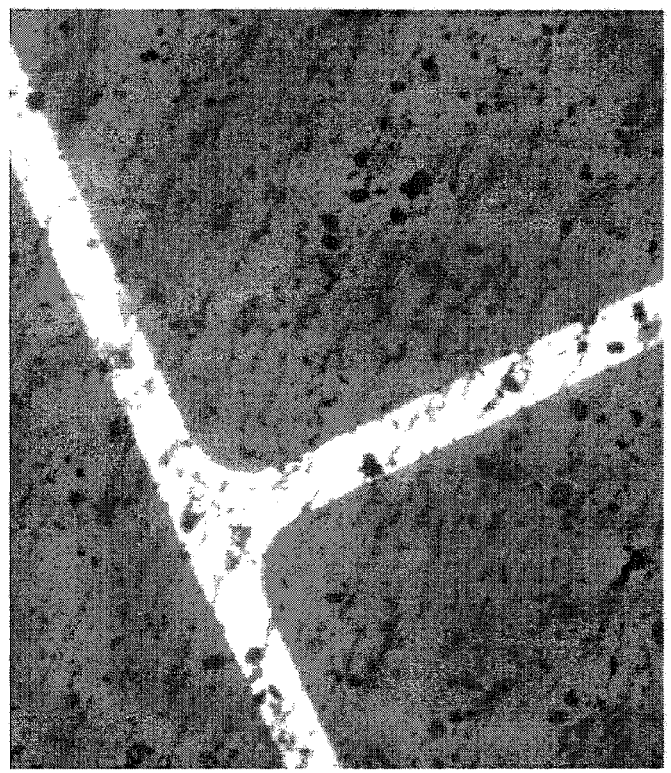
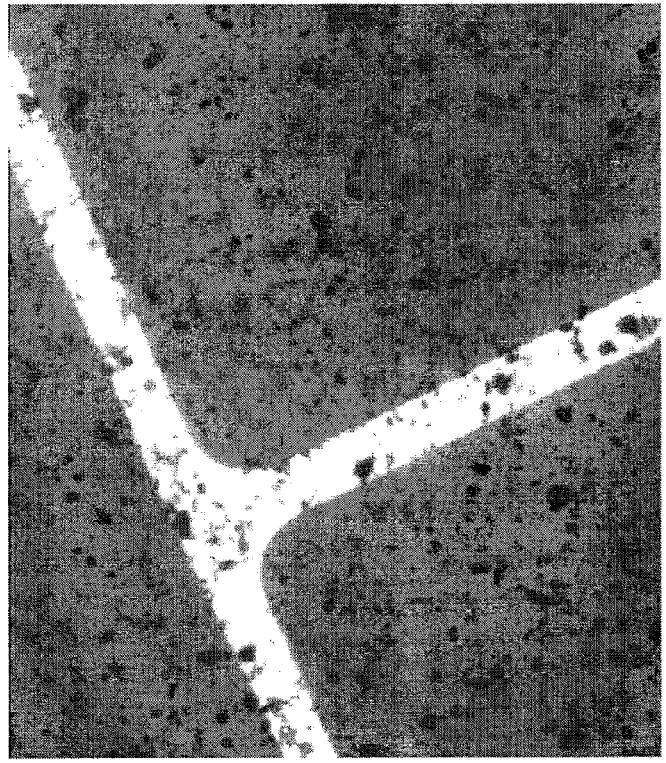
Fig. 8

ALIGNMENT OF CARBON NANOTUBES COMPRISING MAGNETICALLY SENSITIVE METAL OXIDES IN NANOFLUIDS

CROSS-REFERENCE TO RELATED APPLICATION

The present application claims priority to provisional patent application Ser. No. 61/383,670 filed Sep. 16, 2010, entitled "Alignment of Carbon Nanotubes Comprising Magnetically Sensitive Metal Oxides in Heat Transfer Nanofluids," which is incorporated by reference into the present application as if set forth verbatim.

FEDERALLY SPONSORED RESEARCH

United States Army Research Laboratories, Cooperative Agreement W911NF-08-2-022. National Aeronautics and Space Administration (NASA) EPSCoR, Award No. NNX09AU83A. Consequently the U.S. Government may have certain rights in this invention.

TECHNICAL FIELD

The present invention relates to nanoparticle mixtures or suspensions. More specifically it relates to compositions and methods of making nanofluids for various applications, including applications related to polymers, heat transfer and conductivity, including electrical and thermal conductivity.

BACKGROUND OF THE INVENTION

Nanoparticles, such as carbon nanoparticles, and nanofluids, or fluids containing nanoparticles, have broad industrial application, including use in polymers, liquid polymers/polymer fluids, polymer dispersions, liquid resins, films, coatings films, reinforced polymer composites, transparent electrodes for displays and solar cells, electromagnetic interference shielding, sensors, medical devices and pharmaceutical drug delivery devices. For example, in the field of semiconductors and electronic devices, nanoparticles, and specifically, conductive nanoparticles of carbon, metals and the like, have been known and enabled to the industry for many years. Examples of US Patent disclosures of such particles and processes are provided, by way of non-limiting examples, in U.S. Pat. Nos. 7,078,276; 7,033,416; 6,878,184; 6,833,019; 6,585,796; 6,572,673; 6,372,077. Also, the advantages of having ordered nanoparticles in these applications is well established. (See, for example, U.S. Pat. No. 7,790,560). By way of another example, the combination of nanoparticles and liquid polymers have been found to improve important properties of rubber articles, such as vehicle tires, and in particular, the tread portion of vehicle tires. U.S. Pat. No. 7,829,624.

Nanofluids have also been used extensively in heat transfer fluids, and provide many advantages over prior heat transfer fluids, including thermal conductivities far above those of traditional solid/liquid suspensions, a nonlinear relationship between thermal conductivity and concentration, strongly temperature-dependent thermal conductivity, and a significant increase in critical heat flux. In addition, although conventional heat transfer fluids, such as water, mineral oil, and ethylene glycol play an important role in many industries including power generation, chemical production, air conditioning, transportation, and microelectronics, their inherently low thermal conductivities have hampered the development of energy-efficient heat transfer fluids that are required in a plethora of heat transfer applications. It has been demonstrated recently that the heat transfer properties of these conventional fluids can be significantly enhanced by dispersing nanometer-sized solid particle and fibers (i.e., nanoparticles) in fluids (Eastman, et al., Appl. Phys. Lett. 2001, 78(6), 718; Choi, et al., Appl. Phys. Lett. 2001, 79(14), 2252).). However, there are limitations for these nanofluids as well. For example, in a typical nanofluid, individual nanoparticles, such as carbon nanotubes (CNTs), are irregularly positioned in the nanofluid with only a random and infrequent chance for them to be in contact with each other, and only very high concentrations (e.g., 1 vol % (~1.4 wt %) of nanoparticle (such as SWNT)) of these nanoparticles seem to produce any noticeable increase in the effective thermal conductivity (Kim, et al., J. Thermophys. Heat Transfer 21 (2007) 451-459; Xie, et al., J. Appl. Phys. 94 (2003) 4967-4971; Hong, et al., J. Thermophys. Heat Transfer 21 (2007) 234-236; Wamkam, et al., J. Appl. Phys. 109 (2011) 024305-024310). However, at these high concentrations, the nanofluid is very viscous and becomes "mud-like," which makes it much less useful as a coolant or for lubrication applications.

The observed substantial increases in the thermal conductivities of nanofluids can have broad industrial applications and can also potentially generate numerous economical and environmental benefits. Enhancement in the heat transfer ability could translate into high energy efficiency, better performance, and low operating costs. The need for maintenance and repair can also be minimized by developing a nanofluid with a better wear and load-carrying capacity. Consequently, classical heat dissipating systems widely used today can become smaller and lighter, thus resulting in better fuel efficiency, less emission, and a cleaner environment.

Recently, increased thermal conductivity has been associated with exposing fluids with iron oxide-encapsulated nanotubes to a magnetic field. The theory behind this approach is that the magnetic field aligns the iron-oxide encapsulated nanotubes, which results in improved thermal conductivity. Although promising, limitations and unknowns were also revealed. For example, the improved thermal conductivity was found to be sporadic and not observed in every single instance.

Accordingly, there is a great need for the development of nanoparticle mixtures or suspensions and nanofluids that have or result in enhanced properties.

BRIEF SUMMARY OF THE INVENTION

An objective of the present invention is to provide a nanoparticle mixture, suspension or fluid that when exposed or subjected to a magnetic field results in a mixture, suspension or fluid with aligned nanoparticles. Such a composition is believed to have utility for many applications in different industries.

Although not wishing to be bound by any particular scientific theory, it is believed aligned nanoparticles, especially carbon nanoparticles, provide various benefits over other nanofluids and other fluids, by reducing the amount of carbon chain interaction, improving the flow of ions, and providing a more ordered structure. In the instance of polymers and polymer liquids, fluids, dispersions, oils, suspensions and mixtures, the alignment is believed to prevent or help prevent the aggregation of the nanoparticles and lead to enhanced polymer characteristics. These enhanced polymer characteristics include reductions in scission and degradation, improved conductivity (e.g., electrical, energy, heat, etc.), enhanced chemical properties (through more ordered spatial orientation that results in more consistent intramolecular forces and dipole interaction), physical properties (e.g., a more ordered spatial orientation imparts increased structural flexibility and strength). As for heat transfer applications, this alignment is believed to provide enhanced thermal conductivity properties.

Generally, the present invention relates to compositions of nanoparticle mixtures or suspensions and nanofluids, including hydrophilic nanofluids, nanolubricants and nanogreases. The nanoparticle mixture or suspension of the present invention comprises magnetically sensitive nanoparticles, non-magnetically sensitive nanoparticles and surfactant(s). The nanofluid comprises the nanoparticle mixture or suspension and a fluid (or liquid). Other useful components, such as chemical additives, may be added to the nanoparticle mixture or suspension or nanofluid as well. The magnetic nanoparticles, nonmagnetic nanoparticles, surfactant, and/or any other components may be dispersed in the nanofluid as separate components or in combinations (in any order). Once dispersed in the thermal transfer fluid, the nanoparticles and/or magnetically sensitive materials or metal oxides are exposed or subjected to a magnetic field, which produces a nanofluid with improved polymer and thermal conductivity characteristics.

In one aspect, surfactant(s) are attached to the nonmagnetically sensitive particles forming a surfactant and nonmagnetically sensitive particle complexes (S/NSP Complexes). The S/NSP Complexes are then, in turn attached to the magnetically sensitive nanoparticles. In one embodiment, the attachment occurs prior to dispersement of the surfactant, nonmagnetically sensitive particles, and magnetically sensitive particles in the fluid. In another embodiment, the attachment occurs after dispersement of the surfactant(s), nonmagnetically sensitive particles, and magnetically sensitive particles in the fluid. In yet another embodiment, the nanoparticles and surfactant(s) are attached to each other by electrostatic attraction.

In one aspect, the nanoparticles of the nanofluids of the present invention are nanotubes. In one embodiment, the nanotubes single-walled nanotubes, double-walled nanotubes or multi-walled nanotubes. In a preferred embodiment, the nanotubes are single-walled nanotubes (SWNT), multi-walled nanotubes (MWNT) or double-walled nanotubes (DWNT).

In a second aspect, the nonmagnetically sensitive nanoparticles of the present invention are various materials that have been used to make polymers and heat transfer nanofluids. In one embodiment, the nonmagnetically sensitive nanoparticles are carbon, graphite or graphene particles. In a particularly preferred embodiment, the nonmagnetically sensitive nanoparticles are carbon particles, and more preferably, carbon nanotubes. In another embodiment, a substantial amount, or greater than about 90%, of the nonmagnetically sensitive nanoparticles are aligned. In a preferred embodiment, greater than or about 95% of the nonmagnetically sensitive nanoparticles are aligned.

In a third aspect, the magnetically sensitive nanoparticles of the present invention are various materials that respond orientationally to a magnetic or electric field. In an embodiment, the magnetically sensitive nanoparticles are magnetically sensitive metals or metal oxides. In a preferred embodiment, the magnetically sensitive nanoparticles are: Fe, Co, $Fe_2O_3$, or $Fe_3O_4$. In a particularly preferred embodiment, the magnetically sensitive nanoparticles are $Fe_2O_3$.

In a fourth aspect, the surfactants of the nanofluids of the present invention are ionic or charged surfactants, but selected to "match" the charge of the magnetically sensitive nanoparticles. By way of example, in one embodiment, if the magnetically sensitive nanoparticle has a positive charge, a surfactant with a net negative charge should be selected. In another embodiment, if the magnetically sensitive nanoparticle has a negative charge, a surfactant with a net positive charge should be selected. Accordingly, the pH of the surfactant should be considered when selecting surfactant(s) to be included in the nanoparticle mixtures or suspensions or nanofluids of the present invention. Therefore, in an embodiment, the surfactant(s) of the present invention have an appropriate pH that maintains, imparts (or helps to impart) or results in a desired charge effect or net charge, whether positive or negative. In second embodiment, the surfactants are anionic or with a negative net charge. In a preferred embodiment, the anionic surfactants of the present invention are sodium dodecylbenzene sulfonate (NaDDBS). In another embodiment, the surfactants are cationic or with a positive net charge. In a preferred embodiment, the cationic surfactants of the present invention are cetyl trimethylammonium bromide (CTAB). CTAB is also known as hexadecyl trimethyl ammonium bromide.

In another aspect, the nanofluids of the present invention have combinations of specific pH ranges and surfactant(s). In one embodiment, if the surfactant(s) have a net negative charge, the pH of the fluid is greater than about 5. In another embodiment, if the surfactant(s) have a net positive charge, the pH of the fluid is less than about 9.

In yet another aspect, it was found that the fluids of the present invention having higher dipole moments result in more rapid alignment. Therefore, in one embodiment, the fluids of the present invention have a dipole moment at least or greater than about zero (0), at least or greater than about 1, at least or greater than about two 2, or at least or greater than about 3.

In accordance with the present invention, a process for preparing a nanofluid of the present invention is disclosed. In one aspect, the nonmagnetically sensitive materials, magnetically sensitive nanoparticles and surfactant(s) either as separate components (in any order, either singly, in combination or as a mixture or suspension) are added to or dispersed in a fluid. Other components, such as additives, may be added as well. Then, a magnetic field is applied to or directed on fluid and its components. In one embodiment, the magnetic field is applied until the alignment of the nonmagnetically sensitive nanoparticles reaches a maximum amount or when the enhancement of polymer characteristics or increase of conductivity (such as electrical or thermal conductivity) reaches a maximum.

In one embodiment, the nonmagnetically sensitive particles are attached to surfactant(s) to form one or more surfactant and nonmagnetically sensitive particle complexes (S/NSP Complexes) prior to dispersing the surfactants and nonmagnetically sensitive nanoparticles in the fluid. In another embodiment, magnetically sensitive particles are attached to the S/NSP Complexes prior to dispersing the surfactants, nonmagnetically sensitive nanoparticles and magnetically sensitive nanoparticles in the fluid. In a separate embodiment, nonmagnetically sensitive particles are attached to surfactant(s) to form one or more surfactant and nonmagnetically sensitive particle complexes (S/NSP Complexes) after dispersing the surfactants and nonmagnetically sensitive particles in the fluid. In a further embodiment, magnetically sensitive particles are attached to S/NSP Complexes prior to dispersing the surfactants, nonmagnetically sensitive nanoparticles and magnetically sensitive nanoparticles in the fluid. In a yet another embodiment, electrostatic attraction is used to attach the S/NSP Complexes to the magnetically sensitive particles.

In accordance with the present invention, a method of increasing the alignment of nanoparticles in a fluid (and, thereby, increasing thermal conductivity or enhancing the polymer characteristics of the nanofluid). In one aspect, the method is directed to exposing a nanofluid containing nanoparticles to a magnetic field. In one embodiment, the method includes the steps of analyzing or verifying the components of the nanofluid prior to or after exposing the nanofluid to a magnetic field. In a second embodiment, the method includes the step of adding nonmagnetically sensitive nanoparticles, surfactants with the appropriate charge, and/or magnetically sensitive nanoparticles (as separate components or combinations (such as the S/NSP Complex), if not already present or in low amounts, to the fluid prior to exposing the fluid to a magnetic field.

Another objective of the present invention is to increase the conductivity of nanofluids with low nanoparticle concentrations. Although conductivity, such as thermal conductivity, generally increases with higher nanoparticle concentrations, high concentrations result in higher viscosity, which may not be desirable for applications in which low viscosity is desirable, such as for coolants, An advantage if the nanofluids of the present invention is that increased conductivity, such as thermal conductivity (TC), is observed even with nanofluids with nanoparticle concentrations at lower levels. In one embodiment, the concentration of nanoparticles in the nanofluids of the preset invention is no greater than about 30%, no greater than about 15%, no greater than about 10%, no greater than about 5%, no greater than about 2.5%, or no greater than about 1%, no greater than about 0.5%, no greater than about 0.2%, no greater than about 0.1%, or no greater than about 0.05% by weight of nanoparticles Other aspects of the present invention are described throughout the specification.

BRIEF DESCRIPTION OF THE DRAWINGS

FIG. 2A shows images of 0.017 weight % SWNT, 0.017 weight % $Fe_2O$, and 0.17% NaDBBS in DI water prior to exposure to a magnetic field.

FIG. 2B shows images of 0.017 weight % SWNT, 0.017 weight % $Fe_2O$, and 0.17% NaDBBS in DI water after exposure to a magnetic field.

FIG. 6A shows the alignment of nanotubes in the direction of a magnetic field in scale bar 100 µm.

FIG. 6B shows the alignment of nanotubes in the direction of a magnetic field in scale bar 10 µm.

FIG. 8A shows the interaction of nanotube, metal oxide and surfactant in 0.017 weight % SWNT, 0.017 weight % $Fe_2O$, and 0.17% CTAB in DI water.

FIG. 8B shows the interaction of nanotube, metal oxide and surfactant in 0.017 weight % SWNT, 0.017 weight % $Fe_2O$, and 0.17% CTAB in DI water one hundred and twenty (120) seconds after exposure to a magnetic field.

DETAILED DESCRIPTION OF THE INVENTION

Figure 1:
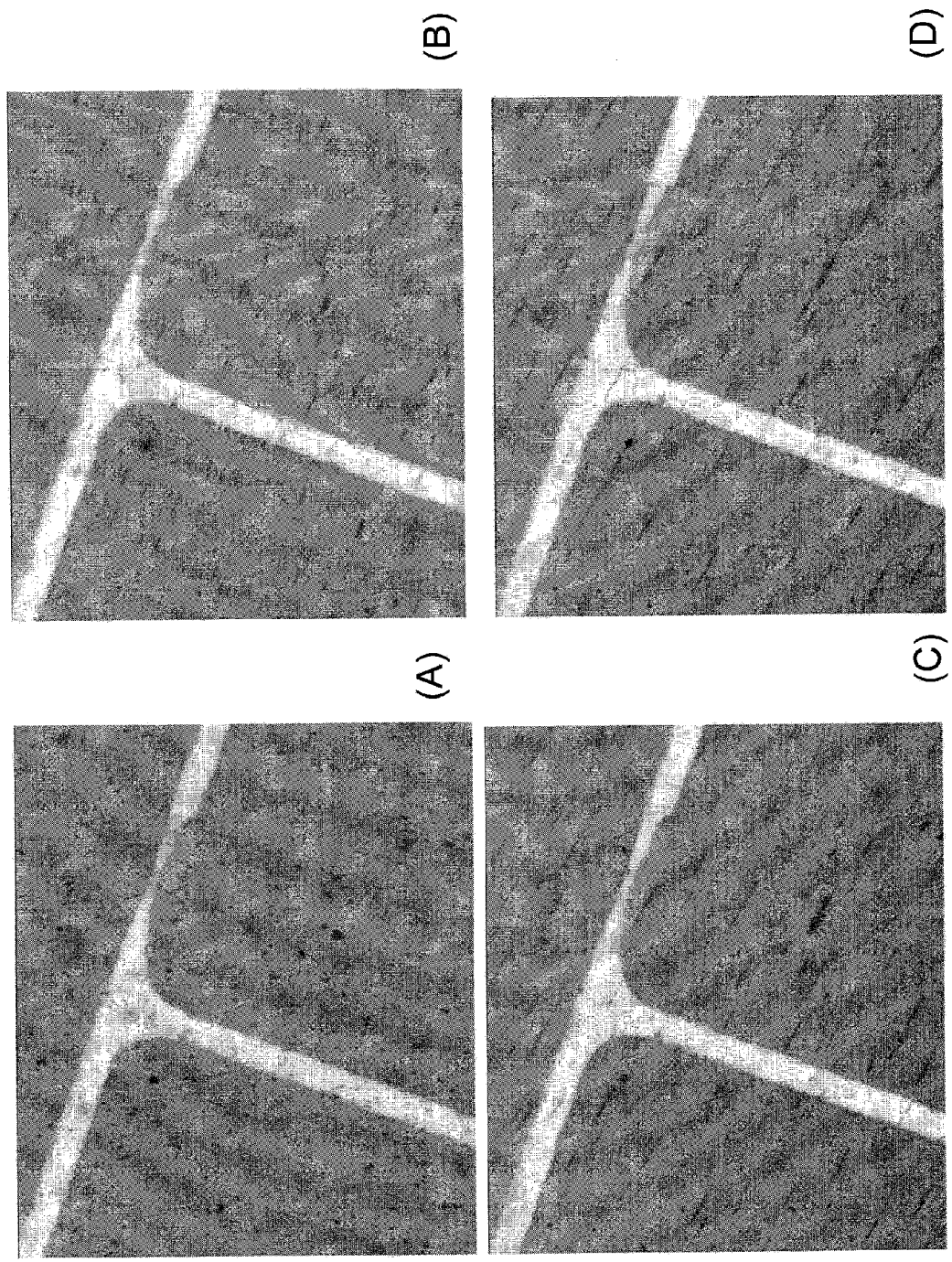
FIG. 1A shows the arrangement of carbon nanotubes in 0.017 weight % SWNT, 0.017 weight % $Fe_2O$, and 0.17% NaDBBS in DI water.
FIG. 1B shows the arrangement of carbon nanotubes in 0.017 weight % SWNT, 0.017 weight % $Fe_2O$, and 0.17% NaDBBS in DI water thirty (30) seconds after being exposed to a magnetic field.
FIG. 1C shows the arrangement of carbon nanotubes in 0.017 weight % SWNT, 0.017 weight % $Fe_2O$, and 0.17% NaDBBS in DI water sixty (60) seconds after being exposed to a magnetic field.
FIG. 1D shows the arrangement of carbon nanotubes in 0.017 weight % SWNT, 0.017 weight % $Fe_2O$, and 0.17% NaDBBS in DI water one hundred and twenty (120) seconds after being exposed to a magnetic field.

The present invention relates to methods of enhancing the properties or characteristics of magnetically sensitive nanofluids and compositions of magnetically sensitive nanoparticle mixtures and nanofluids, including hydrophilic nanofluids, nanolubricants and nanogreases. In general, the nanoparticle mixtures and nanofluids of the present invention comprise nonmagnetically sensitive nanoparticles, magnetically sensitive nanoparticles and surfactant(s). Additionally, the nanomixtures and nanofluids of the present invention may further comprise chemical additives to provide other desired chemical and physical characteristics, such as antiwear, corrosion protection and thermal oxidative properties.

The present invention also relates to the exposure of the nanoparticle mixtures or suspensions or nanofluids of the present invention to a magnetic field. While not wishing to be bound by any particular scientific theory, it is believed that the electrostatic attraction between a surfactant and nonmagnetically sensitive nanoparticle (S/NSP) complex and magnetically sensitive nanoparticle aids in the attachment and aggregation between and among the N/NSP complexes and magnetically sensitive nanoparticles. Accordingly, it is further believed that subjecting nanofluids containing nonmagnetically sensitive nanoparticles and surfactant(s) dispersed with magnetically sensitive nanoparticles, to a magnetic field aligns, aggregates and/or orients (or helps the aligning, aggregation and/or orienting) of the nonmagnetic nanoparticles in the nanofluids, which among other things, results in increased thermal conductivity. In this manner, the nanoparticles become "magnetically guided nanoparticles."

As used in this disclosure, the singular forms "a", "an", and "the" may refer to plural articles unless specifically stated otherwise. To facilitate understanding of the invention set forth in the disclosure that follows, a number of terms are defined below.

All patents, patent applications, articles and website information (as of the access date) cited and referenced herein are incorporated by reference in their entireties.

DEFINITIONS

The term "dipole moment" or "electrical dipole moment" refers to a measure of the separation of positive and negative electrical charges in a system of charges, that is, a measure of the charge system's overall polarity (with, for example, SI units of Coulomb-meter (C m)).

The term "nanotube" refers to a class of macromolecules which have a shape of a long thin cylinder.

The term "SWNT" refers to a single-walled carbon nanotube.

The term "MWNT" refers to a multi-walled carbon nanotube.

The term "D-SWNT" refers to a double-walled carbon nanotube.

The term "F-SWNT" refers to a fluorinated SWNT.

The term "carbon nanoparticle" refers to a nanoparticle which contain primarily carbon element, including diamond, graphite, fullerenes, carbon nanotubes, carbon fibers, and combinations thereof.

The term "magnetic field" refers to a field of force associated with changing electric fields, as when electric charges are in motion. Magnetic fields exert deflective forces on moving electric charges.

The term "magnetically sensitive" or "magnetic-field-sensitive" refers to the characteristic of responding orientationally to the presence of an electric or a magnetic field. The terms "magnetically sensitive" and "magnetic-field-sensitive" are used interchangeably in the present invention.

The term "nanoparticle" refers to a particle having at least one dimension that is no greater than about 500 nm, and sometimes no greater than about 100 nm, and includes, for example, "nanospheres," "nanorods," "nanocups," "nanowires," "nanoclusters," "nanolayers," "nanotubes," "nanocrystals," "nanobeads," "nanobelts," and "nanodisks."

The term "nanoscale" refers to a dimension that is no greater than about 500 nm, and sometimes no greater than about 100 nm. The terms "nanoscale particle" and "nanoparticle" are used interchangeably in the present invention.

The term "nonmagnetically sensitive" or "nonmagnetic-field-sensitive" refers to the characteristic of not responding (or responding weakly) orientationally to the presence of an electric or a magnetic field. The terms "nonmagnetically sensitive" and "nonmagnetic-field-sensitive" are used interchangeably in the present invention.

The term TAO" refers to polyalphaolefin.

The term "Polyol ester" refers to an ester of an organic compound containing at least two hydroxyls with at least one carboxylic acid.

The term "surfactant" refers to a molecule having surface activity, including wetting agents, dispersants, emulsifiers, detergents, and foaming agents, etc.

Nanoparticles:

The nanoparticles of the present invention may be any conventional nanoparticle used in polymers, polymer fluids, and thermal transfer fluids. The nanoparticles may be selected based upon their stability, solubility, thermophysical, electrical, mechanical, size, and zeta potential (e.g., surface charge) properties.

The magnetically sensitive nanoparticles include material which responds orientationally to the presence of an electric or a magnetic field, such as magnetically sensitive metals and metal oxides. Such magnetically sensitive metals and metal oxides include, but are not limited to, Fe, Co, $Fe_2O_3$, and $Fe_3O_4$. The magnetic nanoparticles may be paramagnetic or ferromagnetic.

As for non-magnetically sensitive particles, preferred non-magnetically sensitive nanoparticles of the present invention are carbon nanoparticles, and particularly preferred non-magnetically sensitive nanoparticles are carbon nanotubes. A more detailed discussion of carbon nanoparticles and carbon nanotubes is set forth supra.

In an embodiment, two or more nanoparticles are attached to each other. In one preferred embodiment, carbon nanoparticles, such as carbon nanotubes, are attached to metals or metal oxides. Any conventional method may be used to attach the nanoparticles to each other. However, it has been observed that carbon nanotubes and iron oxide ($Fe_2O_3$) dispersed together in a deionized water/ethylene glycol solution to form a nanofluid and then, exposed to a magnetic field, do not result in any increased thermal conductivity for the nanofluid. While not wishing to be bound by any scientific theory, it is believed that metal or metal oxide may detach from the nanotube under a strong magnetic field or that the amount of metal or metal oxide that was attached to the nanotube was too trivial. Therefore, a preferred embodiment is to use a method that can create a binding force that can withstand the shear forces of a strong magnetic field, such as electrostatic attraction, to attach the nanoparticles to each other. In this regard, selecting a surfactant to "match" the charge of the magnetically charged nanoparticle is important for attaching the non-magnetically charged nanoparticles to the magnetically charged nanoparticles. For example, if the magnetically sensitive nanoparticle has a positive charge, a surfactant with a net negative charge should be selected so as to aid in the connecting the nonmagnetically sensitive nanoparticle, via the S/NSP Complex, to the magnetically sensitive nanoparticle (and enhance the electrostatic attraction between the nanoparticles). In one embodiment, if the surfactant(s) have a net negative charge the pH of the fluid is greater than about 5. In another embodiment, if the surfactant(s) have a net positive charge, the pH of the fluid is less than about 10. In addition, by providing a fluid having an appropriate pH, a charge effect between the surfactant molecules and the magnetically sensitive nanoparticles can be maintained. The nonmagnetically sensitive nanoparticles can then be maintained in suspension due to the charge effect between the head groups on the surfactant molecules. Therefore, in another aspect, the nanofluids of the present invention have combinations of specific pH ranges and surfactant(s). In one embodiment, if the surfactant(s) have a net negative charge the pH of the fluid is greater than about 5. In another embodiment, if the surfactant(s) have a net positive charge, the pH of the fluid is less than about 9. As an alternative embodiment, the pH of the fluid may be adjusted below the pH point of zero charge, or "pHpzc" at which pH the magnetically sensitive nanoparticle's surface is neutral.

Carbon Nanoparticles:

Carbon nanoparticles have a high heat transfer coefficient and high thermal conductivity, which often exceed these of the best metallic material. For example, it has been reported that single wall carbon nanotubes (SWNT) may exhibit a thermal conductivity value as high as 2000-6000 W/m-K under ideal circumstances. By contrast, typical heat transfer fluids like water and oil, have thermal conductivity values of only 0.6 W/m-K and 0.2 W/m-K, respectively. Many forms of carbon nanoparticles can be used in the present invention, including carbon nanotubes, diamond, fullerenes, graphite, carbon fibers, and combinations thereof.

Carbon nanotubes ("CNT") are macromolecules in the shape of a long thin cylinder often with a diameter in few nanometers. The basic structural element in a carbon nanotube is a hexagon which is the same as that found in graphite. Based on the orientation of the tube axis with respect to the hexagonal lattice, a carbon nanotube can have three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice. Nanotubes of these configurations often exhibit different physical and chemical properties. For example, an armchair nanotube is always metallic whereas a zigzag nanotube can be metallic or semiconductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of a carbon nanotube molecule can also contain other size rings, such as pentagon and heptagon. Replacement of some regular hexagons with pentagons and/or heptagons can cause cylinders to bend, twist, or change diameter, and thus lead to some interesting structures such as "Y-," "T-," and "X-junctions," and different chemical activities. Those various structural variations and configurations can be found in both SWNT and MWNT. However, the present invention is not limited by any particular configuration and structural variation. The carbon nanotube used in the present invention can be in the configuration of armchair, zigzag, chiral, or combinations thereof. The nanotube can also contain structural elements other than hexagon, such as pentagon, heptagon, octagon, or combinations thereof.

Another structural variation for MWNT molecules is the arrangement of the multiple tubes. A perfect MWNT is like a stack of graphene sheets rolled up into concentric cylinders with each wall parallel to the central axis. However, the tubes can also be arranged so that an angle between the graphite basal planes and the tube axis is formed. Such MWNT is known as a stacked cone, Chevron, bamboo, ice cream cone, or piled cone structures. A stacked cone MWNT can reach a diameter of about 100 nm. In spite of these structural variations, all MWNTs are suitable for the present invention as long as they have an excellent thermal conductivity. The term MWNT used herein also includes double-walled nanotubes ("DWNT").

Carbon nanotubes used in the present invention can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Such molecules include alloys of these elements such as alloys of Cobalt with S, Br, Pb, Pt, Y, Cu, B, and Mg, and compounds such as the carbides (i.e. TiC, MoC, etc.) The present of these elements, alloys and compounds within the core structure of fullerenes and nanotubes can enhance the thermal conductivity of these nanoparticles which then translates to a higher thermal conductive nanofluid when these nanoparticles are suspend in a heat transfer fluid.

Carbon nanoparticles used in the present invention can also be chemically modified and functionalized, such as covalently attached hydrophilic groups to increase their solubility in hydrophilic fluids or lipophilic chains to increase their solubility in hydrophobic oils. Covalent functionalization of carbon nanoparticles, especially carbon nanotubes and fullerenes, has commonly been accomplished by three different approaches, namely, thermally activated chemistry, electrochemical modification, and photochemical functionalization. The most common methods of thermally activated chemical functionalization are addition reactions on the sidewalls. For example, the extensive treatment of a nanotube with concentrated nitric and sulfuric acids leads to the oxidative opening of the tube caps as well as the formation of holes in the sidewalls and thus produces a nanotube decorated with carboxyl groups, which can be further modified through the creation of amide and ester bonds to generate a vast variety of functional groups. The nanotube molecule can also be modified through addition reactions with various chemical reagents such halogens and ozone. Unlike thermally controlled modification, electrochemical modification of nanotubes can be carried out in more selective and controlled manner. Interestingly, a SWNT can be selectively modified or functionalized either on the cylinder sidewall or the optional end caps. These two distinct structural moieties often display different chemical and physical characteristics. The functional groups on functionalized carbon nanoparticles may be attached directly to the carbon atoms of a carbon nanoparticle or via chemical linkers, such as alkylene or arylene groups. To increase hydrophilicity, carbon nanoparticles can be functionalized with one or more hydrophilic functional groups, such as, sulfonate, carboxyl, hydroxyl, amino, amide, urea, carbamate, urethane, and phosphate. To increase hydrophobicity, carbon nanoparticles may be functionalized with one or more hydrophobic alkyl or aryl groups. The functionalized carbon particle may have no less than about 2, no less than about 5, no less than about 10, no less than about 20, or no less than about 50 functional groups on average.

The term "carbon nanotube" used herein refers to all structural variations and modification of SWNT and MWNT discussed hereinabove, including configurations, structural defects and variations, tube arrangements, chemical modification and functionalization, and encapsulation.

Carbon nanotubes are commercially available from a variety of sources. Single-walled carbon nanotubes can be obtained from Carbolex (Broomall, Pa.), MER Corporation (Tucson, Ariz.), and Carbon Nanotechnologies Incorporation ("CNI", Houston, Tex.). Multi-walled carbon nanotubes can be obtained from MER Corporation (Tucson, Ariz.) and Helix material solution (Richardson, Tex.). However, the present invention is not limited by the source of carbon nanotubes. In addition, many publications are available with sufficient information to allow one to manufacture nanotubes with desired structures and properties. The most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon-containing gas, such as acetylene, ethylene, ethanol, etc., with a metal catalyst particle, such as cobalt, nickel, or ion, at temperatures above 600° C.

The selection of a particular carbon nanoparticle depends on a number of factors. The most important one is that the nanoparticle has to be compatible with an already existing base fluid (a thermal transfer fluid) discussed thereafter. Other factors include heat transfer properties, cost effectiveness, solubility, dispersion and settling characteristics. In one embodiment of the present invention, the carbon nanoparticles selected contain predominantly single-walled nanotubes. In another embodiment, the carbon nanoparticles selected contain predominantly multi-walled nanotubes. In yet another embodiment, the carbon nanoparticles are functionalized chemically. The functionalized carbon nanoparticles may be soluble in a hydrophilic thermal transfer fluid, which are suitable for preparing a hydrophilic nanofluid, or in a hydrophobic thermal transfer fluid, which are suitable for preparing a hydrophobic nanofluid.

Fluid:

In the present invention, the major component of the nanofluid is a fluid, which may be either hydrophilic or hydrophobic. The fluid may be any conventional fluid used in polymer and thermal transfer applications. For example, a hydrophilic fluid is commonly used in coolants whereas a hydrophobic fluid is commonly used in a lubricant or grease.

The fluid may be a single component or multi-component mixture. For example, a hydrophilic fluid may contain water, ethylene glycol, and diethylene glycol in various proportions. The hydrophilic fluid may contain about 0.1 to about 99.9% by volume of water, about 0.1 to 99.9% by volume of ethylene glycol, and about 0.1 to 99.9% by volume of diethylene glycol; and about 20 to about 80%, about 40 to about 60%, or about 50% by volume of water or ethylene glycol. Typically, diethylene glycol constitutes a minor component of the hydrophilic fluid, in no greater than about 20%, no greater than about 10%, or no greater than about 5% of the total volume. Nevertheless, the total amount of all the components in a fluid together equals to 100%.

It was found that the fluids of the present invention having higher dipole moments result in more rapid alignment. Therefore, in one embodiment, the fluids of the present invention have a dipole moment at least or greater than about zero (0), at least or greater than about one (1), greater than or about two (2), greater than or about (3). Examples of fluids for use in the present invention and their corresponding dipole moments are: hexane (with a dipole moment of zero (0)), water (with a dipole moment of 1.85), and dimethylformamide (DMF) (with a dipole moment of 3.82).

Hydrophilic Fluid

The hydrophilic fluid of the present invention includes a hydrophilic liquid that are miscible with water, including water, aliphatic alcohols, alkylene glycols, di(alkylene) glycols, monoalkyl ethers of alkylene glycols or di(alkylene) glycols, and various mixtures thereof. Suitable aliphatic alcohols contain no greater than 6 carbons and no greater than 4 hydroxyls, such as methanol, ethanol, isopropanol, and glycerol. Suitable alkylene glycols contain no greater than 5 carbons, such as ethylene glycol, propylene glycol, and 1,2-butylene glycol. Particularly, the hydrophilic thermal transfer fluid comprises ethylene glycol, propylene glycol, and mixtures thereof. Ethylene glycol and propylene glycol are excellent antifreeze agents and also markedly reduce the freezing point of water. Suitable di(alkylene) glycols contain no greater than 10 carbons, such as diethylene glycol, triethylene glycol, tetraethylene glycol, and dipropylene glycol. Commercial antifreeze coolants often contain more than one glycol compounds. For example, Prestone antifreeze coolant contains 95 to 100% of ethylene glycol and no greater than 5% of diethylene glycol. The mixture as used herein refers to a combination of two or more hydrophilic liquids. As used herein, the term "alkylene glycol" refers to a molecule having glycol functional moiety in its structure in general, including alkylene glycol, alkylene glycols, di(alkylene) glycols, tri(alkylene) glycols, tetra(alkylene) glycols, and their various derivatives, such as ethers and carboxylic esters.

The hydrophilic fluid may contain one or more hydrophilic molecules. For example, the hydrophilic thermal transfer fluid may contain water, aliphatic alcohols, alkylene glycols, or various mixtures thereof. The hydrophilic thermal transfer fluid may be a two-component mixture which contains water and ethylene glycol in various proportions. The hydrophilic thermal transfer fluid may contain about 0.1 to about 99.9%, about 20 to about 80%, about 40 to about 60%, or about 50% by volume of water.

Hydrophobic Fluid

The hydrophobic fluid used in the present invention may be selected from a wide variety of well-known organic oils (also known as base oils), including petroleum distillates, synthetic petroleum oils, greases, gels, oil-soluble polymer composition, vegetable oils, and combinations thereof. Petroleum distillates, also known as mineral oils, generally include paraffins, naphthenes and aromatics.

Synthetic petroleum oils are the major class of lubricants widely used in various industries. Some examples include alkylaryls such as dodecylbenzenes, tetradecylbenzenes, dinonylbenzenes, and di-(2-ethylhexyl)benzenes; polyphenyls such as biphenyls, terphenyls, and alkylated polyphenyls; fluorocarbons such as polychlorotrifluoroethylenes and copolymers of perfluoroethylene and perfluoropropylene; polymerized olefins such as polybutylenes, polypropylenes, propylene-isobutylene copolymers, chlorinated polybutylenes, poly(1-octenes), and poly(1-decenes); organic phosphates such as triaryl or trialkyl phosphates, tricresyl phosphate, trioctyl phosphate, and diethyl ester of decylphosphonic acid; and silicates such as tetra(2-ethylhexyl)silicate, tetra(2-ethylbutyl)silicate, and hexa(2-ethylbutoxy)disiloxane. Other examples include polyol esters, polyglycols, polyphenyl ethers, polymeric tetrahydrofurans, and silicones.

In one embodiment of the present invention, the hydrophobic fluid is a diester which is formed through the condensation of a dicarboxylic acid, such as adipic acid, azelaic acid, fumaric acid, maleic acid, phtalic acid, sebacic acid, suberic acid, and succinic acid, with a variety of alcohols with both straight, cyclic, and branched chains, such as butyl alcohol, dodecyl alcohol, ethylene glycol diethylene glycol monoether, 2-ethylhexyl alcohol, isodecyl alcohol, hexyl alcohol, pentaerytheritol, propylene glycol, tridecyl alcohol, and trimethylolpropane. Modified dicarboxylic acids, such as alkenyl malonic acids, alkyl succinic acids, and alkenyl succinic acids, can also be used. Specific examples of these esters include dibutyl adipate, diisodecyl azelate, diisooctyl azelate, di-hexyl fumarate, dioctyl phthalate, didecyl phthalate, di(2-ethylhexyl)sebacate, dioctyl sebacate, dicicosyl sebacate, and the 2-ethylhexyl diester of linoleic acid dimer, the complex ester formed by reacting one mole of sebacic acid with two moles of tetraethylene glycol and two moles of 2-ethylhexanoic acid.

In another embodiment, the hydrophobic fluid is a polyalphaolefin which is formed through oligomerization of 1-olefines containing 2 to 32 carbon atoms, or mixtures of such olefins. Some common alphaolefins are 1-octene, 1-decene, and 1-dodecene. Examples of polyalphaolefins include poly-1-octene, poly-1-decene, poly-1-dodecene, mixtures thereof, and mixed olefin-derived polyolefins. Polyalphaolefins are commercially available from various sources, including DURASYN® 162, 164, 166, 168, and 174 (BP-Amoco Chemicals, Naperville, Ill.), which have viscosities of 6, 18, 32, 45, and 460 centistokes, respectively.

In yet another embodiment, the hydrophobic fluid is a polyol ester which is formed through the condensation of a monocarboxylic acid containing 5 to 12 carbons and a polyol and a polyol ether such as neopentyl glycol, trimethylolpropane, pentaerythritol, dipentaerythritol, and tripentaerythritol. Examples of commercially available polyol esters are ROYCO® 500, ROYCO® 555, and ROYCO® 808. ROYC® 500 contains about 95% of pentaerythritol esters of saturated straight fatty acids with 5 to 10 carbons, about 2% of tricresyl phosphate, about 2% of N-phenyl-alpha-naphthylamine, and about 1% of other minor additives. ROYCO® 808 are about 30 to 40% by weight of trimethylolpropane esters of heptanoic, caprylic and capric acids, 20 to 40% by weight of trimethylolpropane esters of valeric and heptanoic acids, about 30 to 40% by weight of neopentyl glycol esters of fatty acids, and other minor additives. Generally, polyol esters have good oxidation and hydrolytic stability. The polyol ester for use herein preferably has a pour point of about −100° C. or lower to −40° C. and a viscosity of about 2 to 100 centistoke at 100° C.

In yet another embodiment, the hydrophobic fluid is a polyglycol which is an alkylene oxide polymer or copolymer. The terminal hydroxyl groups of a polyglycol can be further modified by esterification or etherification to generate another class of known synthetic oils. Interestingly, mixtures of propylene and ethylene oxides in the polymerization process will produce a water soluble lubricant oil. Liquid or oil type polyglycols have lower viscosities and molecular weights of about 400, whereas 3,000 molecular weight polyglycols are viscous polymers at room temperature.

In yet another embodiment, the hydrophobic fluid is a combination of two or more selected from the group consisting of petroleum distillates, synthetic petroleum oils, greases, gels, oil-soluble polymer composition, and vegetable oils. Suitable examples include, but not limited to, a mixture of two polyalphaolefins, a mixture of two polyol esters, a mixture of one polyalphaolefine and one polyol ester, a mixture of three polyalphaolefins, a mixture of two polyalphaolefins and one polyol ester, a mixture of one polyalphaolefin and two polyol esters, and a mixture of three polyol esters. In all the embodiments, the thermal transfer fluid preferably has a viscosity of from about 1 to about 1,000 centistokes, more preferably from about 2 to about 800 centistokes, and most preferably from about 5 to about 500 centistokes.

In yet another embodiment, the hydrophobic fluid is grease which is made by combining a petroleum or synthetic lubricating fluid with a thickening agent. The thickeners are generally silica gel and fatty acid soaps of lithium, calcium, strontium, sodium, aluminum, and barium. The grease formulation may also include coated clays, such as bentonite and hectorite clays coated with quaternary ammonium compounds. Sometimes carbon black is added as a thickener to enhance high-temperature properties of petroleum and synthetic lubricant greases. The addition of organic pigments and powders which include arylurea compounds indanthrene, ureides, and phthalocyanines provide high temperature stability. Sometimes, solid powders such as graphite, molybdenum disulfide, asbestos, talc, and zinc oxide are also added to provide boundary lubrication. Formulating the foregoing synthetic lubricant oils with thickeners provides specialty greases. The synthetic lubricant oils include, without limitation, diesters, polyalphaolefins, polyol esters, polyglycols, silicone-diester, and silicone lubricants. Nonmelting thickeners are especially preferred such as copper phthalocyanine, arylureas, indanthrene, and organic surfactant coated clays.

Surfactant:

A variety of surfactants can be used in the present invention as a dispersant to facilitate uniform dispersion of nanoparticles and to enhance stabilization of such dispersion as well. Typically, the surfactants used in the present invention contain an lipophilic hydrocarbon group and a polar functional hydrophilic group. The polar functional group can be of the class of carboxylate, ester, amine, amide, imide, hydroxyl, ether, nitrile, phosphate, sulfate, or sulfonate. The surfactant can be anionic, cationic, zwitterionic, amphoteric and ampholytic.

In one embodiment, the surfactant is anionic, including sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate, sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, e.g., 2, 3, or 4 units, of ethylene oxide, per each alkyl group. Illustrative examples of alky and aryl sulfonates are sodium tridecyl benzene sulfonate and sodium dodecylbenzene sulfonate.

Illustrative examples of sulfosuccinates include, but not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates. The structures of silicone copolyol sulfosuccinates are set forth in U.S. Pat. Nos. 4,717,498 and 4,849,127, which are both hereby incorporated by reference.

Illustrative examples of sulfosuccinamates include, but not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec inc, West Paterson, N.J.), NaSul CA-HT3 (King industries, Norwalk, Conn.), and C500 (Crompton Co, West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

For an anionic surfactant, the counter ion is typically sodium but may alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations may also be used.

In another embodiment, the surfactant is cationic, including primarily organic amines, primary, secondary, tertiary or quaternary. For a cationic surfactant, the counter ion can be chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine, and tallow alkyl amine.

Examples of quaternary amines with a single long alkyl group are cetyl trimethyl ammonium bromide ("CTAB"), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bis-stearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, can also be used.

In yet another embodiment, the surfactant is zwitterionic, which has both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety may contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

In yet another embodiment, the surfactant is amphoteric. Suitable examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

In yet another embodiment, the surfactant is a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, and polystearamides.

In yet another embodiment, the surfactant is an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

In yet another embodiment, the surfactant used in the present invention is a combination of two or more selected from the group consisting of anionic, cationic, zwitterionic, amphoteric, and ampholytic surfactants. Suitable examples of a combination of two or more surfactants of the same type include, but not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

Suitable examples of a combination of two surfactants of the different types include, but not limited to, a mixture of one anionic and one cationic surfactant, a mixture of one anionic and one zwitterionic surfactant, a mixture of one anionic and one amphoteric surfactant, a mixture of one anionic and one ampholytic surfactant, a mixture of one cationic and one zwitterionic surfactant, a mixture of one cationic and one amphoteric surfactant, a mixture of one cationic and one ampholytic surfactant, a mixture of one nonionic and one zwitterionic surfactant, a mixture of one nonionic and one amphoteric surfactant, a mixture of one nonionic and one ampholytic surfactant, a mixture of one zwitterionic and one amphoteric surfactant, a mixture of one zwitterionic and one ampholytic surfactant, and a mixture of one amphoteric and one ampholytic surfactant. A combination of two or more surfactants of the same type, e.g., a mixture of two anionic surfactants, is also included in the present invention.

The Other Chemical Additives:

The nanofluids of the present invention may also contain one or more other chemicals to provide other desired chemical and physical properties and characteristics, depending on whether they are hydrophobic or hydrophilic. In addition to the chemicals discussed separately below for hydrophilic and hydrophobic polymer or thermal transfer fluids, many other known types of additives such as dyes and air release agents, can also be included in finished compositions produced and/or used in the practice of the present invention. In general, the additive components are employed in nanofluids in minor amounts sufficient to enhance the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid.

Suitable chemical additives for a fluid include, but are not limited to, buffering agents, corrosion inhibitors, defoamers, scale inhibitors, and dyes.

The buffering agents may be selected from any known or commonly used buffering agents. It will be appreciated by those skilled in the art that selected buffering agents can exhibit both anti-corrosion and buffering properties. In certain formulations, for example, benzoates, borates, and phosphates can provide both buffering and anti-corrosion advantages. In addition, a base can be used to adjust the pH value of a nanofluid. Illustrative examples of bases for use with this invention include commonly known and used bases, for example, inorganic bases such as KOH, NaOH, NaHCO$_3$, K$_2$CO$_3$, and Na$_2$CO$_3$. Therefore, the buffering system and base can be adapted to provide a nanofluid composition with a pH level between 7.5 and about 11.

The corrosion inhibitors may be either an organic additive or an inorganic additive. Suitable organic anti-corrosive additives include short aliphatic dicarboxylic acids such as maleic acid, succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Suitable inorganic additives include borates, phosphates, silicates, nitrates, nitrites, and molybdates.

Suitable defoamers include components such as silicon defoamers, alcohols such as polyethoxylated glycol, polypropoxylated glycol or acetylenic glycols.

Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer.

The basic composition of the nanofluids of the present invention can be tailored for selective applications. For example, nitrates and silicates are known to provide aluminum protection. Borates and nitrites can be added for ferrous metal protection, and benzotriazole and tolytriazole can be added for copper and brass protection.

Suitable chemical additives for a hydrophobic fluid include, but are not limited to, antioxidants, corrosion inhibitors, copper corrosion inhibitors, friction modifiers, viscosity improvers, pour point depressants, and seal-swelling agents.

Suitable antioxidants include phenolic antioxidants, aromatic amine antioxidants, sulfurized phenolic antioxidants, and organic phosphates. Examples include 2,6-di-tert-butylphenol, liquid mixtures of tertiary butylated phenols, 2,6-di-tert-butyl-4-methylphenol, 4,4'-methylenebis(2,6-di-tert-butylphenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenylamine, phenyl-alpha-naphthylamine, and phenyl-beta-naphthylamine.

Suitable corrosion inhibitors include dimer and trimer acids, such as those produced from tall oil fatty acids, oleic acid, or linoleic acid; alkenyl succinic acid and alkenyl succinic anhydride corrosion inhibitors, such as tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride; and the half esters of alkenyl succinic acids having 8 to 24 carbon atoms in the alkenyl group with alcohols such as the polyglycols. Other suitable corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof.

Suitable copper corrosion inhibitors include thiazoles such as 2-mercapto benzothiazole; triazoles such as benzotriazole, tolyltriazole, octyltriazole, decyltriazole, and dodecyltriazole; and thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles.

Suitable friction modifiers include aliphatic amines, aliphatic fatty acid amides, aliphatic carboxylic acids, aliphatic carboxylic esters, aliphatic carboxylic ester-amides, aliphatic phosphonates, aliphatic phosphates, aliphatic thiophosphonates, and aliphatic thiophosphates, wherein the aliphatic group usually contains above about eight carbon atoms so as to render the compound suitably oil soluble. Also suitable are aliphatic substituted succinimides formed by reacting one or more aliphatic succinic acids or anhydrides with ammonia.

Suitable viscosity improvers include olefin copolymers, polymethacrylates, hydrogenated styrene-diene, and styrene-polyester polymers. Also suitable are acrylic polymers such as polyacrylic acid and sodium polyacrylate; high-molecular-weight polymers of ethylene oxide; cellulose compounds such as carboxymethylcellulose; polyvinyl alcohol; polyvinyl pyrrolidone; xanthan gums and guar gums; polysaccharides; alkanolamides; amine salts of polyamide; hydrophobically modified ethylene oxide urethane; silicates; and fillers such as mica, silicas, cellulose, wood flour, clays (including organoclays) and nanoclays; and resin polymers such as polyvinyl butyral resins, polyurethane resins, acrylic resins and epoxy resins.

Most pour point depressants are organic polymers, although some nonpolymeric substances have been shown to be effective. Both nonpolymeric and polymeric depressants can be used in the present invention. Examples include alkylnaphthalenes, polymethacrylates, polyfumarates, styrene esters, oligomerized alkylphenols, phthalic acid esters, ethylenevinyl acetate copolymers, and other mixed hydrocarbon polymers. The treatment level of these additives is usually low. In nearly all cases, there is an optimum concentration above and below which pour point depressants become less effective.

Suitable seal-swelling agents include dialkyl diesters of adipic, azelaic, sebacic, and phthalic acids. Examples of such materials include n-octyl, 2-ethylhexyl, isodecyl, and tridecyl diesters of adipic acid, azelaic acid, and sebacic acid, and n-butyl, isobutyl, pentyl, hexyl, heptyl, octyl, nonyl, decyl, undecyl, dodecyl, and tridecyl diesters of phthalic acid. Also useful are aromatic hydrocarbons with suitable viscosity.

In addition to the chemicals listed, many other known types of additives such as dyes, foam inhibitors, demulsifiers, and air release agents, can also be included in finished compositions produced and/or used in the practice of the present invention. In general, the additive components are employed in nanofluids in minor amounts sufficient to enhance the performance characteristics and properties of the base fluid. The amounts will thus vary in accordance with such factors as the viscosity characteristics of the base fluid employed, the viscosity characteristics desired in the finished fluid, the service conditions for which the finished fluid is intended, and the performance characteristics desired in the finished fluid.

Physical Agitation:

The nanofluid of the present invention may be prepared by any conventional means of dispersing a mixture of the appropriate carbon nanoparticles, metal oxide nanoparticles, surfactant(s), and/or other optional chemical additives. For example, a common approach is using a physical method to form a stable suspension of nanoparticles in a fluid. A variety of physical mixing methods are suitable for use in the present invention, including a conventional mortar and pestle mixing, high shear mixing, such as with a high speed mixer, homogenizers, microfluidizers, high impact mixing, and ultrasonication methods.

Among these methods, ultrasonication is one of the least destructive to the structures of carbon nanoparticles. Ultrasonication can be done either in the bath-type ultrasonicator, or by the tip-type ultrasonicator. Typically, tip-type ultrasonication is for applications which require higher energy output. Ultrasonication at a intermediate intensity for up to 60 minutes (min), and usually in a range of from 10 to 30 minutes is desired to achieve better homogeneity. Additionally, the mixture is ultrasonicated intermittently to avoid overheating. It is well known that overheating can cause covalent bond breakage in a carbon nanotube, which cause the nanotube to lost its beneficial physical properties. As such, the carbon nanoparticle-containing mixture is generally energized for a predetermined period of time with a break in between. Each energizing period is no more than about 30 min, no more than about 15 min, no more than 10 min, no more than 5 min, no more than 2 min, no more than 1 min, or no more than 30 seconds. The break between ultrasonication pulses provides the opportunity for the energized carbon nanoparticles to dissipate the energy. The break is typically no less than about 1 min, no less than about 2 min, no less than about 5 min, or between about 5 to about 10 min.

The raw material mixture may also be pulverized by any suitable known dry or wet grinding method. One grinding method includes pulverizing the raw material mixture in the fluid mixture of the present invention to obtain a concentrate, and the pulverized product may then be dispersed further in a liquid medium with the aid of the dispersants described above. However, pulverization or milling often reduces the carbon nanotube average aspect ratio.

It will be appreciated that the individual components can be separately blended into the thermal transfer fluid, or can be blended therein in various subcombinations, if desired. Ordinarily, the particular sequence of such blending steps is not critical. Moreover, such components can be blended in the form of separate solutions in a diluent. It is preferable, however, to blend the components used in the form of an additive concentrate, as this simplifies the blending operations, reduces the likelihood of blending errors, and takes advantage of the compatibility and solubility characteristics afforded by the overall concentrate.

Physical agitation methods particularly suitable for making nanogrease are those employing relatively high shearing or dispersing devices, including, but not limited to, Morehouse mills, Buxton knife mills, Gaulin homogenizers, colloid mills, rotating knife-edge mills, rotor-stator mills, and three-roll mills. In an exemplary embodiment, after a final grease composition is achieved, the resulting grease is generally passed one or more times through one of these shearing or dispersing devices to enhance the characteristics (e.g., smoothness, shear stability, oil separation and bleed properties) and to maximize the thickening power of a grease thickener, such as carbon nanotubes.

Formulation:

The nanofluid of the present invention is a dispersion of nonmagnetically sensitive nanoparticles, magnetically sensitive nanoparticles, and surfactant(s) in a fluid. The nonmagnetically sensitive nanoparticles, magnetically sensitive nanoparticles, and surfactant(s) may be dispersed in the fluid separately or as a nanoparticle mixture or suspension. The nanoparticle mixture or suspension may include nonmagnetically sensitive particles, magnetically sensitive particles, and surfactant(s).

In one embodiment, the nanofluid contains no less than about 80%, no less than about 85%, no less than about 90%, or no less than about 95% by weight of a fluid. The nanofluid contains no greater than about 30%, no greater than about 15%, no greater than about 10%, no greater than about 5%, no greater than about 2.5%, or no greater than about 1%, no greater than about 0.5%, no greater than about 0.2%, no greater than about 0.1%, or no greater than about 0.05% by weight of nanoparticles.

In one embodiment, the magnetically sensitive nanoparticles are magnetically sensitive metals and metal oxides, and more preferably, iron oxide ($Fe_2O_3$). In another embodiment, the non-magnetically sensitive nanoparticles are carbon particles, carbon nanotubes.

In another aspect, the nanofluids of the present invention have combinations of specific pH ranges and surfactant(s). In one embodiment, if the surfactant(s) have a net negative charge the pH of the fluid is greater than about 5. In another embodiment, if the surfactant(s) have a net positive charge, the pH of the fluid is less than about 10.

The nanoparticles of the present invention are attached to each other in combinations of two or more nanoparticles. In one embodiment, magnetically sensitive nanoparticles are attached to nonmagnetically sensitive particles. In a preferred embodiment, the nanofluid contains no less than about no less than about 90%, no less than 95%, or no less than 98% by weight of attached nanoparticles. The nanoparticles may be attached to each other through any conventional methods including: chemical bonding and Ni coating. However, a preferred method of attachment is electrostatic attraction. As opposed to chemical and other bonding means, through electrostatic attraction, the conjugated structure (in this instance, for example, the S/NSP Complex bound to a magnetically sensitive nanoparticle) is maintained, and not altered.

The nanofluids of the present invention include one or more surfactants. The nanofluid contains from about no greater than 10%, no greater than 1%, no greater than 0.5%, no greater than 0.2%, from 0.1 to about 30%, from about 1 to about 20%, from about 1 to about 15%, or from about 1 to about 10% by weight of surfactant(s).

The nanofluid may further comprise other additives to improve chemical and/or physical properties. Typically, the amount of these additives together is no greater than about 10% by weight of the nanofluid. Nevertheless, the total amount of all the ingredients of the nanofluid together should equal to 100%.

Upon exposure to a magnetic field, the nanofluids of the present invention exhibit enhanced polymer characteristics and thermal conductivities. For example, upon exposure to a magnetic field, the nanofluids of the present invention exhibit an increase of thermal conductivity of at least about 50%, at least about 60%, at least about 70%, at least about 80%, or at least about 90%. The thermal conductivity enhancement depends upon various factors, including the components in the nanofluid, the time of exposure to the magnetic field, and the amount of attachment of the components and/or detachment of the attached components in the nanofluid.

The nanofluids may be prepared by dispersing the nanoparticles, along with the surfactant(s), directly into a mixture of a fluid separately, or as part of a pre-mixture or suspension, and other additives with a physical agitation, such as ultrasonication. However, the order of addition of the individual or attached components is not critical for the practice of the invention.

Magnetic Field:

Magnets and magnet field generating devices are well-known. The magnetic field used in the present invention may be generated by any conventional means for creating a magnetic field. Common magnets or devices that generate a magnetic field include, but are not limited to: permanent magnets, magnetic materials which create a changing magnetic field, ferromagnetic components, and solenoid magnets. The magnets or magnetic material may be fluxing, fixed, moving or otherwise, and may create pulsed, changing, fluxing, modulating, and/or fixed/constant magnetic, waved or energy fields (as a few examples). They may including alternating poles, north poles, south poles, or combinations thereof, and different shapes of the magnets and magnetic fields, all within the same magnet or magnetic layer.

The magnetic fields may be of any strength, which is typically measured as Gauss or Tesla units (with one (1) Tesla=$10^4$ Gauss). Generally, the speed of alignment increases with increasing magnetic field strength. Therefore, magnetic field generators or magnets with various strengths may be selected to provide a desirable alignment speed.

A simple way to create a magnetic field of the present invention is to provide by a pair of spaced, Ba-ferrite magnet plates. A magnetic field is created in-between the gap of the two plates. To be exposed to the magnetic field generated by the magnet plates, the nanofluid is placed in the gap in-between the magnetic plates.

Magnetic particles in a liquid medium can assume a variety of configurations, depending on the nature of the magnetic particles and the strength of the magnetic field (McCormack, et al., J. Electron. Mater. 23 (1994) 715-720; Philip, et al., Appl. Phys. Lett. 92 (2008) 043108-043110; Shima, et al., J. Phys. Chem. 114 (2010) 18825-18833; Zhu, et al., Appl. Phys. Lett. 89 (2006) 023123-023125). Under a magnetic field, small magnetic particles form interconnected networks and tend to get become spatially oriented along the magnetic field. This in turn, moves the carbon nanotubes nearby and induces more physical contacts, which is anticipated to improve thermal conductivity (Wright, et al., Appl. Phys. Lett. 91 (2007) 173116-173118; Horton, et al., J. Appl. Phys. 107 (2010) 104320-104322).

The amount of alignment and therefore, amount of enhanced polymer and thermal conductivity, is related to the amount of time of exposure to a magnetic field. It was found that at a certain period of time of exposure to a magnetic field (e.g., Tmax), alignment reaches a maximum and the enhanced or increased polymer characteristics or thermal conductivity will also reach a maximum. After this Tmax, there was found to be either no further increased alignment (and enhanced or increased polymer characteristics or thermal conductivity) or reduced alignment (and reduced or decreased polymer characteristics or thermal conductivity) from Tmax. For example, thermal conductivity was measured with 0.017 wt % SWNT, 0.017 wt % $Fe_2O_3$ and 0.17 wt % NaDDBS in DI water under a magnetic field of 0.62 kG. Thermal conductivity was measured at the following time intervals (with the corresponding thermal conductivity (TC) values: 5 seconds (0.53), 10 seconds (0.93), 30 seconds (1.23) and 60 seconds (0.70).

EXPERIMENTS

Single wall carbon nanotubes (SWNT) were purchased from Helix Material. Solutions Inc. in Richardson, Tex. The magnetically sensitive Fe2O3 nano particles with an average diameter of 5-25 nm, and chemical surfactant sodium dodecylbenzene sulfonate (NaDDBS) were purchased from Sigma Aldrich.

Sonication was performed using a Branson Digital Sonifier, model 450. A magnetic field was provided by a pair of spaced, Ba-ferrite magnet plates (4×6×1 inch). The sample was placed in the middle of gap between the magnets. In order to magnetize the Fe2O3 particles, samples were exposed to a magnetic field for approximately one hour before usage.

A Redlake Model PCI-2000S Motion Scope (MASD Inc, San Diego, Calif.) was used to observe the behavior of nano particles mixture. The detection parameters used were: record rate 250, Shutter 1/250, trigger 70%. The lens were a WHB 10X/20 and MPlan 10X/0.25. Images of the solvent effects were observed using an Olympus IX71 optical microscope and recorded using a Princeton Instruments PIXIS CCD camera.

The pH values were measured using a pH Mettler Toledo model SevenEAsy S20. The thermal conductivity data was obtained using a Hot Disk™ thermal constants analyzer (whose product details may be found at http://www.hot-disk.se, which was last accessed on Sep. 14, 2011), using the following parameters: measurement depth of 6 mm, room temperature, power of 0.012 W, measurement time of 15 s, sensor radius of 3.189 mm, temperature coefficient of resistance of 0.0471/K, disk type Kapton, and temperature drift rec yes. The uncertainty of the thermal conductivities in the nanofluids was within 3%.

The magnetic field intensity was recorded using a F. W. Bell Gaussmeter Model 5060. Scanning electron microscopy (SEM) images were acquired using the backscattered electron detector on a Zeiss Supra40VP variable pressure system.

Experiment 1

Microscopy Showing Nanoparticle Alignment

Microscope images of 0.017 wt % SWNT, 0.017 wt % Fe2O3 and 0.17 wt % NaDDBS in DI water were obtained using the high speed microscope video system—A: 0 min; B: 0.5 min; C: 1 min; D: 2 min are shown in FIG. 1. A magnetic field (H=0.62 kG) was applied with an internal reference of 30 μm. As shown in FIG. 1A, it is clearly apparent that at zero min the carbon nanotube, metal oxide Fe2O3 and surfactant NaDDBS mixtures are randomly dispersed in the water. As is the case for pristine nanotubes, these mixtures are also entangled and look like scattered dots (most of these dots are much less than 30 μm in diameter) in the microscope image. With the addition of the external magnetic field, the "scattered dots" start to stretch, vibrate and align, as shown in FIG. 1B, as quickly as 30 seconds after the application of the magnetic field. As time progresses, FIG. 1C—approximately 1 min after the application of the magnetic field, the aligned nanoparticles continue to vibrate and enlarge. Eventually, at approximately 2 minutes (FIG. 1D), these randomly dispersed dots form larger and longer lines, indicating aggregated and entangled nanotubes and metal oxide mixtures that have been formed to create aligned chains and clusters under the external magnetic field.

FIG. 2 illustrates the microscopic images of a 0.017 wt % SWNT, 0.017 wt % Fe2O3 and 0.17 wt % NaDDBS solution in DI water as observed using the digital camera. FIG. 2A illustrates the image before the magnetic field, while FIG. 2B illustrates the effect of the magnetic field (H=0.62 kG). Internal reference is 30 μm. The images confirm what we discussed in FIG. 1 and give the scene in large area. The aligned chains in the images appear to be continuous, indicating that these mixtures are aligned, but form chains and clusters.

It is intuitive that the particles would move towards the direction of magnetic field. However, these nanotube and metal oxide mixtures do not exhibit significant movement under the influence of the magnetic field. Instead, the aligned nanotube lines continue to stretch longer and move closer together, forming longer and thicker lines. After some time (>12 h), they start to precipitate, and lines of black particles along the magnetic field at the bottom of vessel are clearly observed.

This observed phenomenon coincides very well with the previously reported time dependent thermal conductivity results of carbon nanotubes and metal oxides in water (Hong, et al., Synth. Met. 157 (2007) 437-440). Without carbon nanotubes and the application of the magnetic field, the thermal conductivity value of $Fe_2O_3$ nanofluids is approximately 0.62~0.63 W/m·K and remains nearly constant with respect to time. Because of the small number of contacts between the Fe2O3 nanoparticles, the thermal conductivity value is essentially the same as the value for the DI water itself. With the addition of carbon nanotubes, the thermal conductivity increases to approximately 0.70 W/m·K and is apparently independent of time. The reasonable explanation for the thermal conductivity enhancement from 0.62-0.63 to 0.70 W/m·K is due to the aggregation of the metal oxide particles on the surface of the nanotubes by electrostatic attraction and the formation of the aggregated chain along the nanotubes (Wenzel, et al., Appl. Phys. Lett. 92 (2008) 023110-023112).

As shown above, high speed microscopy was utilized to allow real time visualization of the movement of single walled carbon nanotubes (SWNT) with magnetically sensitive nanoparticles ($Fe_2O_3$) and a chemical surfactant (NaDSSB) in water. Initially, entangled SWNT, $Fe_2O_3$ and NaDSSB mixtures were randomly dispersed in the fluid. Upon extended exposure to the magnetic field, the mixture slowly vibrated, the nanoparticles straightened and aligned with respect to the magnetic field. The aligned nanoparticle chains appeared to be continuous and unbroken, forming a combination of aligned particles and clusters.

Experiment 2

Effect of Time of Exposure of Magnetic Field on Thermal Conductivity

In the presence of the magnetic field, the thermal conductivity of the nanofluids demonstrates a very interesting behavior. The thermal conductivity initially increases with time, but eventually reaches a peak value of 0.95 W/m·K after exposure to a magnetic field for between two to four minutes, indicating the impact of the nanotube alignment process. Microscopy videos illustrate the time dependent stretching and orientation process of the nanotubes. As the time of exposure to the magnetic field increases, the thermal conductivity decreases. This is thought to be due to the excessive agglomeration of the nanoparticles, creating larger particles that begin to precipitate or settle in the fluid. This last point was confirmed by microscopic examination. In addition, the video images provide an explanation for the impact of longer residence times in the magnetic field, where the thermal conductivity value decreases to approximately 0.63~0.64 W/m·K, even lower than that of the fluid with nanotubes and the magnetic particles $Fe_2O_3$ (0.70 W/m·K). This is attributed to the precipitation and sedimentation of the CNTs together with magnetic particles over extended periods of time and no more particle aggregation exists.

Figure 3:
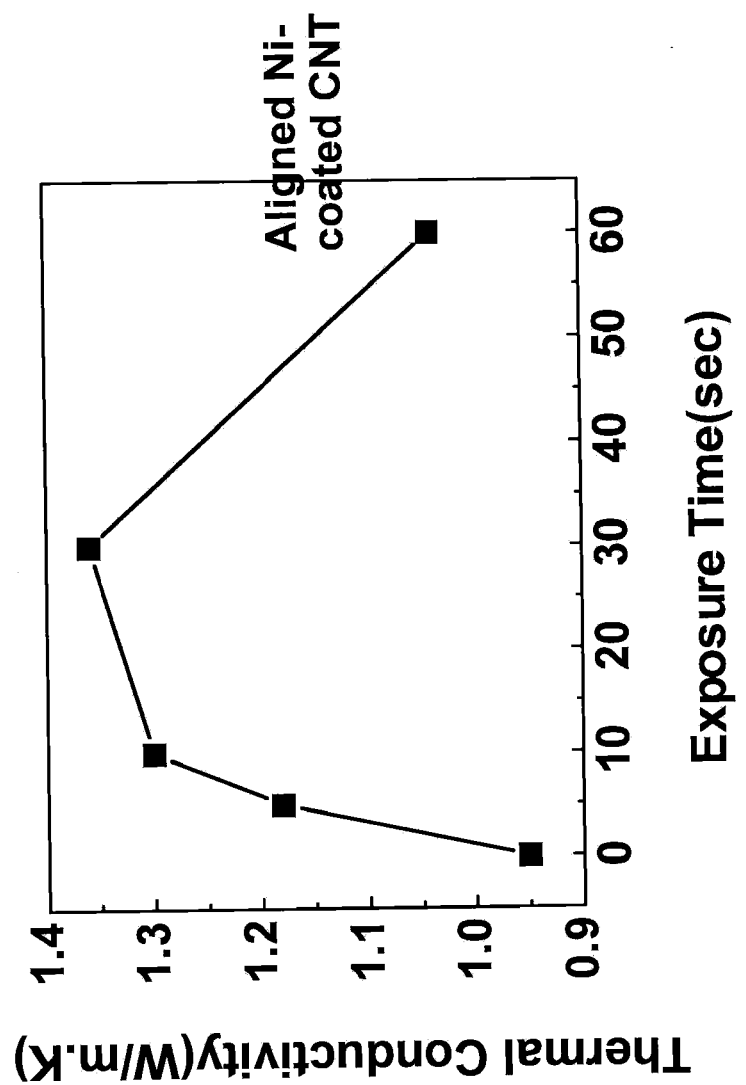
FIG. 3 shows changes in the carbon nanotubes in 0.017 weight % SWNT, 0.017 weight % $Fe_2O$, and 0.17% NaDBBS in DI water after exposure to a magnetic field.

As observed in microscopy images, the carbon nanotube lines stretch longer, move closer together and form longer and thicker lines under the influence of an external magnetic field and as a result, enhance the effective thermal conductivity. In order to determine the influence of the time in residence, nanofluids (0.017 wt % SWNT, 0.017 wt % $Fe_2O_3$ and 0.17 wt % NaDDBS in DI water) were placed in a 0.62 kG magnetic field for times of 5 s, 10 s, 30 s, and 60 s. The magnetic field was then removed and the thermal conductivity value recorded. Table 1 below lists the maximum observed thermal conductivity values and the increased ratios for various exposure times, which is also shown in FIG. 3.

TABLE 1

Effect of exposure time on the thermal conductivity of nanofluids

| Exposure Time | Maximum Thermal Conductivity[a] | Thermal Conductivity |
| --- | --- | --- |
| All the time | 0.95 | 0.53 |
| 5 | 1.18 | 0.93 |
| 10 | 1.30 | 1.13 |
| 30 | 1.36 | 1.23 |
| 60 | 1.04 | 0.70 |

[a]Thermal conductivity was measured with 0.017 wt % SWNT, 0.017 wt % $Fe_2O_3$ and 0.17 wt % NaDDBS in DI water under a magnetic field of 0.62 kG.

As shown in Table 1, with longer exposure to the external magnetic field, the thermal conductivity maximum value increases. At an exposure time of 30 s, the thermal conductivity reaches a maximum value. Further exposure to the magnetic field results in a decrease in the thermal conductivity. It is interesting to note that continued exposure to an external magnetic field leads to the lowest thermal conductivity. This coincides with the microscopy images of the carbon nanotube movement. The results indicate that the gradual magnetic clumping or clustering was the cause of the thermal conductivity decrease.

Because of the semi-continuous nature of these nanosuspensions and the inherent viscosity of the fluid, some minutes are required for the mixtures to respond to the applied magnetic field and align. Time dependent thermal conductivity experiments indicate that the alignment process dominates the thermal conductivity enhancement, as opposed to micro convection.

Experiment 3

Solvent Effect on Alignment

Figure 4:
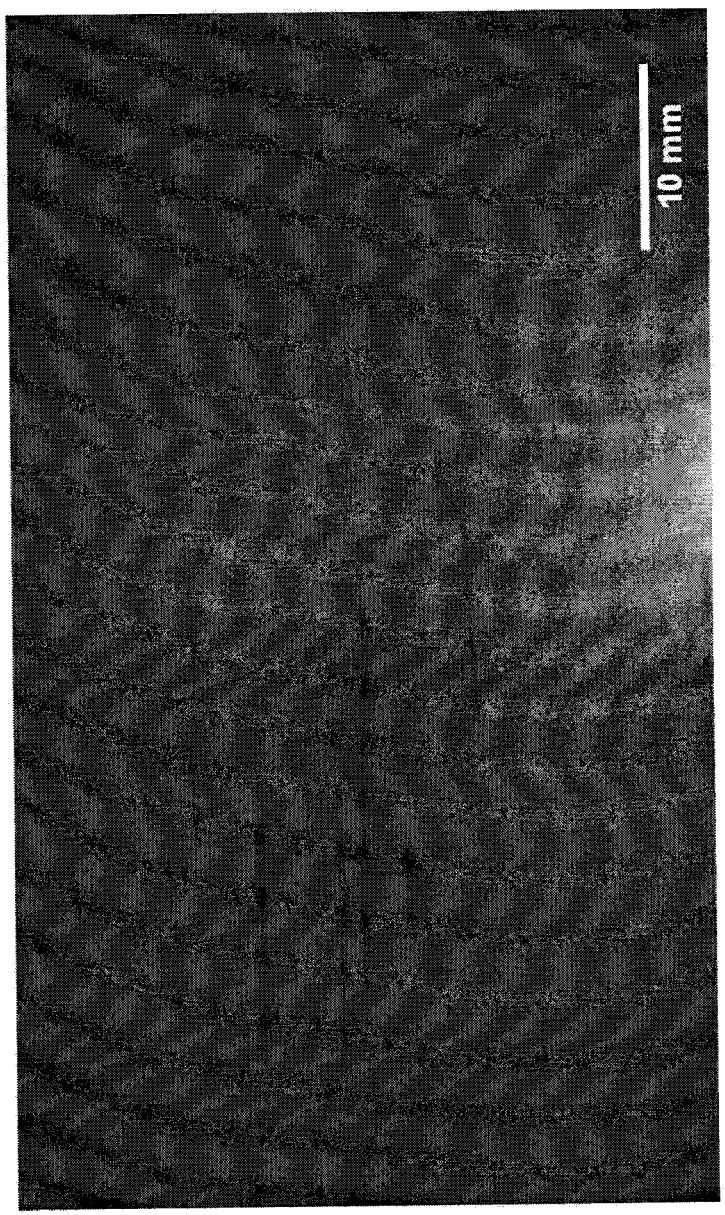
FIG. 4 shows the macrogeometrical effect of magnetically aligned 0.017 weight % SWNT, 0.017 weight % $Fe_2O$, and 0.17% NaDBBS in DI water.
Figure 5:
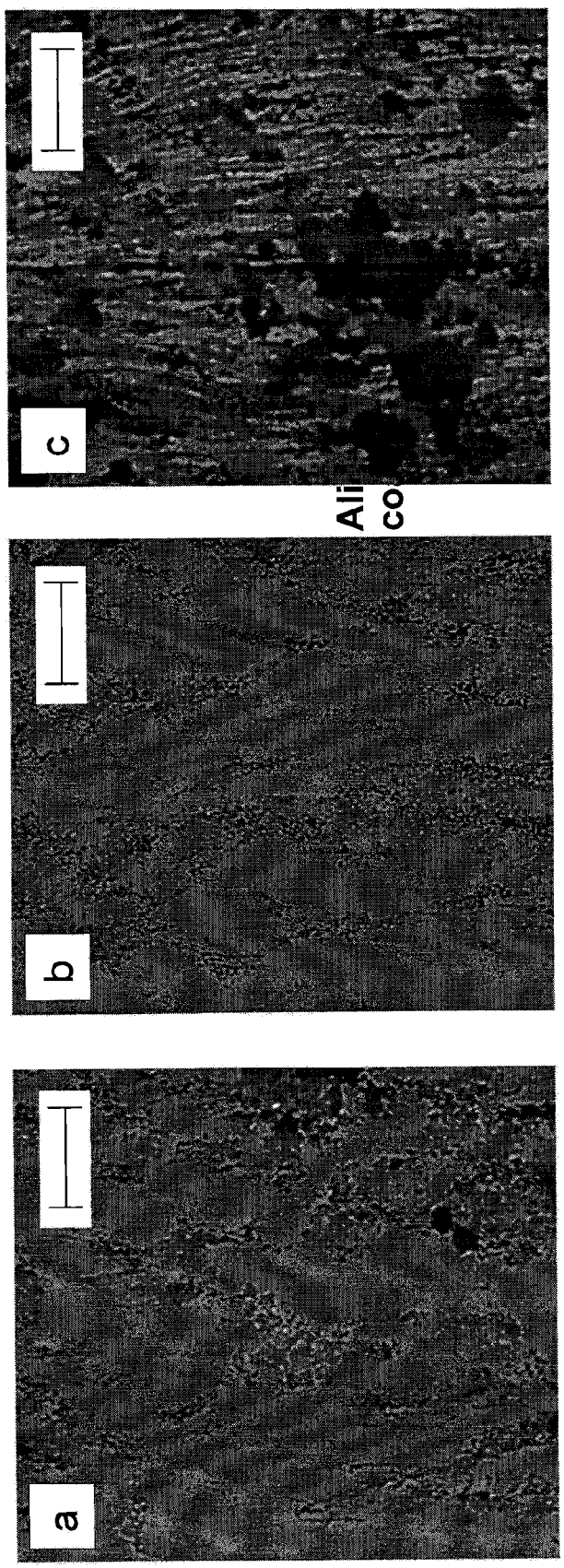
FIG. 5A shows magnetically aligned 0.017 weight % SWNT, 0.017 weight % $Fe_2O$, and 0.17% NaDBBS in hexane.
FIG. 5B shows magnetically aligned 0.017 weight % SWNT, 0.017 weight % $Fe_2O$, and 0.17% NaDBBS in DI water.
FIG. 5C shows magnetically aligned 0.017 weight % SWNT, 0.017 weight % $Fe_2O$, and 0.17% NaDBBS in DMF.

The macrogeometrical effect of magnetically aligned 0.017 wt % SWNT, 0.017 wt % Fe2O3 and 0.17 wt % NaDBS in DI water was evaluated using digital camera images as shown in FIG. 4. It is clearly apparent that the black particles form lines along the magnetic field on the bottom of vessel. While the trend of this alignment is the same, solvents with higher dipole moments demonstrate a more rapid alignment. FIG. 5 illustrates the optical microscope images for 0.017 wt % SWNT, 0.017 wt % Fe2O3 and 0.17 wt % NaDBS in different solvents: (a) Hexane, (b) Water, and (c) DMF. The scale shown is 100 μm. It is well known that dipole moments for Hexane, water, and DMF are 0, 1.85, and 3.82, respectively. Therefore, the alignment trends are different.

Experiment 4

Effect of Alignment Process on Thermal Conductivity

In order to ensure that the alignment process is the dominant factor influencing the thermal conductivity enhancement (as opposed to micro convection), the position of the magnetic field was modified (and hence the magnetic field intensity and orientation) during the time dependent thermal conductivity measurements. This resulted in a change of stability in the fluid. However, no significant differences in the thermal conductivity were observed. The influence of the direction of the magnetic field was observed by manually switching the magnets during the experimental tests to determine if the tangling and contacts among nanotubes, metal oxides and chemical surfactants would be affected. Again, the thermal conductivity did not show any significant differences. Further evidence indicates that the thermal conductivity enhancement could be observed along the applied magnetic field direction, but not along the perpendicular direction (data not shown). If the micro convection assumption is true, then thermal conductivity enhancement in all directions should be comparable. Normally, micro convection effects only last several minutes. The longer time scale of the thermal conductivity enhancement presents strong evidence that thermal conductivity enhancement is not due to micro convection (Shima, et al., Appl. Phys. Lett. 95 (2009) 133112-133114).

The above microscope and thermal conductivity results demonstrate that alignment and orientation of the nanotubes in a fluid are critical and essential to the enhancement of the thermal conductivity of the composite fluid. However, the increase in the ratio of the thermal conductivity is not as significant as anticipated due to the thermal contact resistance in the nanofluids (Bahrami, et al., J. Heat Transfer 126 (2004) 896-905).

Example 5

Effect of Electrostatic Attraction on Aggregation

To verify whether electrostatic attraction between nanotube/surfactant and metal oxides causes aggregation, the charge of the surfactant was changed from a negative charge surfactant (e.g., NaSDDB) to a positive charge surfactant (e.g., CTAB).

As illustrated in FIGS. 6A and 6B respectively, it is clearly apparent that under a magnetic field, the nanotubes align very well in the direction of the magnetic field, either in scale bar 100 μm (A) or 10 μm (B). To verify this, as part of the investigation, drops of the SEM samples containing nanotube, Fe2O3, and NaDSSB were placed on the SEM sample holder and allowed to dry while influenced by the magnetic field. Because extended exposure to magnetic fields will enlarge the aligned chains and clusters and cause them to precipitate, the samples were only exposed to the magnetic field for a short time (2-3 mins). During that time, the samples exhibited near perfect alignment, which resulted in a substantially improved thermal conductivity.

Figure 7:
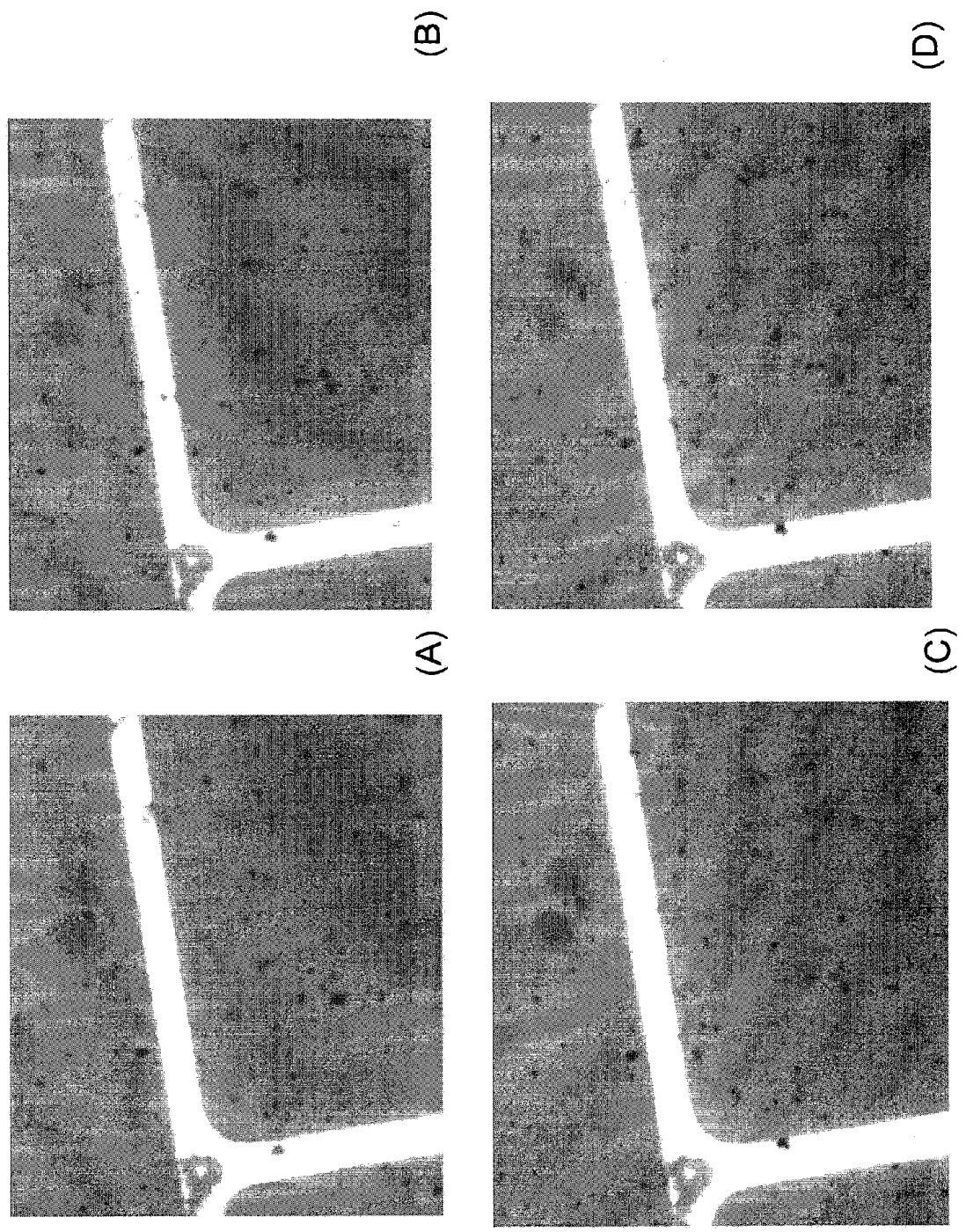
FIG. 7A shows the aggregation among carbon nanotubes, surfactant and metal oxide in 0.017 weight % SWNT, 0.017 weight % $Fe_2O$, and 0.17% CTAB in DI water.
FIG. 7B shows the aggregation among carbon nanotubes, surfactant and metal oxide in 0.017 weight % SWNT, 0.017 weight % $Fe_2O$, and 0.17% CTAB in DI water thirty (30) seconds after exposure to a magnetic field.
FIG. 7C shows the aggregation among carbon nanotubes, surfactant and metal oxide in 0.017 weight % SWNT, 0.017 weight % $Fe_2O$, and 0.17% CTAB in DI water sixty (60) seconds after exposure to a magnetic field.
FIG. 7D shows the aggregation among carbon nanotubes, surfactant and metal oxide in 0.017 weight % SWNT, 0.017 weight % $Fe_2O$, and 0.17% CTAB in DI water one hundred and twenty (120) seconds after exposure to a magnetic field.

Due to the technical limitations of the optical microscope, it is very difficult to obtain real images of the aggregation among the individual carbon nanotubes, the surfactant and the metal oxide. Based upon the initial assumptions, the electrostatic attraction between the nanotube, surfactant and metal oxide causes the aggregation to occur. It is interesting to speculate on the following: If the charge of the surfactant is changed, for example from a negative charge (NaSDDB) to a positive charge (CTAB), then no electrostatic attraction would occur and the $Fe_2O_3$ nanoparticles should separate from the nanotube colloidal domain. To verify this hypothesis, microscopy videos of 0.017 wt % SWNT, 0.017 wt % $Fe_2O_3$ and 0.17 wt % CTAB in DI water were recorded. FIG. 7 shows the microscopic images extracted from the video at: A=0 min; B=0.5 min; C=1 min; and D=2 mins. The magnetic field (H=0.62 kG) was applied with an internal reference of 30 μm.

It is clearly evident that initially (FIG. 7A), the carbon nanotube, metal oxide Fe2O3 and surfactant CTAB mixtures are randomly dispersed in the water. These mixtures are also entangled and look like scattered dots in the microscope image. With the addition of the external magnetic field, the scattered dots start to vibrate, but do not yet stretch and align, only slight and short lines are formed, as shown in FIG. 7 (0.5 min after addition of magnetic field) and FIG. 7C (1 min after addition of magnetic field). At 2 mins. (FIG. 7D), the randomly dispersed black dots (SWNT) remain relatively constant and do not yet appear to form larger and longer lines, similar to FIG. 1. However, some fine lines ($Fe_2O_3$) are formed and alignment appears to begin to take place. These lines are believed to be the $Fe_2O_3$ nanoparticles which supported by the images provided. Although it is impossible to use Redlake CCD microscope image to tell the separation of nanoparticle from nanotube, But, by the trend and macro-effect, we could see the images with electrostatic attraction and without electrostatic attraction are totally different. We also have performed the thermal conductivity measurements and found the results are totally different.

To further support this hypothesis, it would be beneficial to be able to observe some real images of the $Fe_2O_3$ nanoparticle and nanotube/surfactants as they interact. Therefore, microscope images of 0.051 wt % SWNT, 0.051 wt % $Fe_2O_3$ and 0.17 wt % CTAB in DI water were extracted from the video at: A=0 min; B=2 mins. They are shown in FIG. 8. A magnetic field (H=0.62 kG) was applied and the internal reference is 30 μm. The high weight percentage (0.051 wt %) of SWNT and $Fe_2O_3$ and low weight percentage (0.17 wt %) of CTAB exaggerates the dispersion circumstance. As is clearly seen from FIG. 8A, some fine lines are entangled and separated as represented by the big black dots. It is assumed that the entangled fine lines are $Fe_2O_3$ nanoparticles and the large black dots are SWNT/surfactant. If this assumption is correct, then the $Fe_2O_3$ entangled lines will be aligned under the external magnetic field and the SWNT/surfactant will be inactive. FIG. 8B verifies this assumption.

CONCLUSIONS

In summary, observations and real time images of the movement of SWNT, $Fe_2O_3$, and NaDSSB in water under a magnetic field using high speed microscopy were made. Initially, carbon nanotube, metal oxide $Fe_2O_3$, and surfactant NaDSSB mixtures were randomly dispersed (entangled) in the fluid. Upon continued exposure to the magnetic field, the mixture gradually vibrated, stretched out and finally aligned. The aligned chains in the images were found to be endless. This indicates that these mixtures are aligned, but form chains and clusters. Because of the semi-continuous nature of these nano mixtures, as well as the viscosity resistance of the fluid itself, it takes some time for the mixture to respond to the applied magnetic field and to become aligned.

Time dependent thermal conductivity experimental results using different magnetic field intensities and orientations indicate that the alignment process dominates the thermal conductivity enhancement rather than micro convection. Scanning Electron Microscopy (SEM) images also show that the SWNT and $Fe_2O_3$ are aligned well under the influence of a magnetic field.

The assumption that the electrostatic attraction between the nanotube, surfactant and metal oxide causes aggregation by changing the charge nature of surfactant from a negative charge (NaSDDB) to a positive charge (CTAB) is verified.

The significance of electrostatic force induced alignment is that perfect conjugated structure of carbon nanotube is maintained. Therefore, those nanotubes still show excellent thermal, electrical, and mechanical properties.

The examples set forth above are provided to give those of ordinary skill in the art with a complete disclosure and description of how to make and use the preferred embodiments of the compositions and the methods, and are not intended to limit the scope of what the inventors regard as their invention. Modifications of the above-described modes for carrying out the invention that are obvious to persons of skill in the art are intended to be within the scope of the following claims. All publications, patents, and patent applications cited in this specification are incorporated herein by reference as if each such publication, patent or patent application were specifically and individually indicated to be incorporated herein by reference.

We claim:

1. A method of making a nanoparticle composition, comprising the steps of:
    (a) dispersing one or more nonmagnetically sensitive nanoparticles (NSP), one or more magnetically sensitive nanoparticles, and one or more surfactants (S) into a fluid; and
    (b) exposing the fluid and its contents to a magnetic field; wherein the one or more nonmagnetically sensitive nanoparticles are attached to the one or more surfactants to form complexes (S/NSP Complexes) prior to dispersing the surfactants and nonmagnetically sensitive nanoparticles in the fluid.

2. The method according to claim 1, further comprising the step of attaching one or more magnetically sensitive particles to one or more S/NSP Complexes prior to dispersing the surfactants, nonmagnetically sensitive nanoparticles and magnetically sensitive nanoparticles in the fluid.

3. A method of making a nanoparticle composition, comprising the steps of:
    (a) dispersing one or more nonmagnetically sensitive nanoparticles (NSP), one or more magnetically sensitive nanoparticles, and one or more surfactants (S) into a fluid; and
    (b) exposing the fluid and its contents to a magnetic field; wherein the one or more nonmagnetically sensitive nanoparticles are attached to the one or more surfactants to form complexes (S/NSP Complexes) after dispersing the surfactants and nonmagnetically sensitive particles in the fluid.

4. The method according to claim 3, further comprising the step of attaching one or more magnetically sensitive particles to one or more S/NSP Complexes prior to dispersing the surfactants, nonmagnetically sensitive nanoparticles and magnetically sensitive nanoparticles in the fluid.

5. The method according to claim 1 or 3, wherein electrostatic attraction is used to attach the S/NSP Complexes to the magnetically sensitive particles.

6. The method according to claim 1 or 3, wherein the fluid and its contents are exposed until the conductivity of the nanoparticle composition reaches a maximum value.

* * * * *